United States Patent
Feng et al.

(10) Patent No.: US 10,462,772 B2
(45) Date of Patent: Oct. 29, 2019

(54) PHYSICAL DOWNLINK CONTROL CHANNEL, PDCCH, ASSIGNMENT PROCEDURE

(71) Applicant: Panasonic Intellectual Property Corporation of America, Torrance, CA (US)

(72) Inventors: Sujuan Feng, Hessen (DE); Alexander Golitschek Edler Von Elbwart, Hessen (DE); Michael Einhaus, Hessen (DE); Hidetoshi Suzuki, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 15/466,668

(22) Filed: Mar. 22, 2017

(65) Prior Publication Data
US 2017/0195999 A1 Jul. 6, 2017

Related U.S. Application Data

(63) Continuation of application No. PCT/JP2015/003804, filed on Jul. 29, 2015.

(30) Foreign Application Priority Data

Nov. 7, 2014 (EP) .................................... 14192345

(51) Int. Cl.
*H04W 72/04* (2009.01)
*H04L 5/00* (2006.01)
(Continued)

(52) U.S. Cl.
CPC ......... *H04W 72/042* (2013.01); *H04L 5/0053* (2013.01); *H04W 76/27* (2018.02);
(Continued)

(58) Field of Classification Search
CPC ..................................................... H04W 7/042
See application file for complete search history.

(56) References Cited

U.S. PATENT DOCUMENTS

| 2012/0176884 A1 | 7/2012 | Zhang et al. |
| 2013/0022014 A1 | 1/2013 | Hong et al. |
| (Continued) | | |

OTHER PUBLICATIONS

International Search Report of PCT application No. PCT/JP2015/003804 dated Sep. 15, 2015.
(Continued)

*Primary Examiner* — Andrew Lai
*Assistant Examiner* — Andrew C Lee
(74) *Attorney, Agent, or Firm* — Seed IP Law Group LLP

(57) ABSTRACT

The present disclosure relates to a mobile station (UE) for receiving Physical Downlink Control CHannel, PDCCH, assignments in a mobile communication system including serving cells. In case the mobile station is configured with at least two serving cells having different serving cell indices, the UE monitors, for the two serving cells, a same set of candidates for PDCCH assignments defining a same UE-specific search space and which is determined independently of the indices of the serving cells with which the UE is configured, and the UE receives, for the serving cells, PDCCH assignments from among the monitored same set of candidates using carrier indicator field, CIF, values in the received PDCCH assignments for identifying the serving cells with which the UE is configured. The CIF values, included in the received PDCCH assignments, correspond to the respective indices of the serving cells with which the UE is configured.

9 Claims, 14 Drawing Sheets

(51) Int. Cl.
  *H04W 76/27* (2018.01)
  *H04W 88/02* (2009.01)
(52) U.S. Cl.
  CPC ............ *H04L 5/001* (2013.01); *H04L 5/0064* (2013.01); *H04L 5/0098* (2013.01); *H04W 88/02* (2013.01)

(56) References Cited

U.S. PATENT DOCUMENTS

| | | | |
|---|---|---|---|
| 2013/0088972 A1 | 4/2013 | Kim et al. | |
| 2013/0194931 A1* | 8/2013 | Lee | H04L 5/0053 370/241 |
| 2014/0050186 A1* | 2/2014 | Kim | H04W 56/0045 370/329 |
| 2014/0153452 A1* | 6/2014 | Son | H04L 5/001 370/280 |
| 2014/0153506 A1 | 6/2014 | Yang et al. | |
| 2014/0161110 A1* | 6/2014 | Kim | H04L 5/001 370/336 |
| 2015/0029964 A1* | 1/2015 | Seo | H04L 1/0027 370/329 |
| 2015/0043500 A1* | 2/2015 | Kim | H04L 5/001 370/329 |
| 2015/0155928 A1* | 6/2015 | Seo | H04L 5/0053 370/329 |
| 2015/0215097 A1* | 7/2015 | Yi | H04W 52/48 370/329 |
| 2015/0245347 A1* | 8/2015 | Yi | H04L 5/001 370/280 |
| 2016/0065343 A1* | 3/2016 | Kim | H04J 11/0053 370/329 |
| 2016/0285535 A1* | 9/2016 | Kim | H04L 5/0016 |

OTHER PUBLICATIONS

Editor (Motorola Mobility), Introduction of D2D (ProSe), Dual Connectivity, Small Cell Enhancements, and NAICS features, 3GPP TSG-RAN WG1 #78bis, R1-144520, Oct. 2014, pp. 138-151.
3GPP TS 36.211 V8.9.0, "Physical Channels and Modulation (Release 8)", Dec. 2009.
3GPP TS 36.213 V12.3.0, "Physical layer procedures (Release12)", Sep. 2014.
3GPP TS 36.212 V12.2.0, "Multiplexing and channel coding (Release12)", Sep. 2014.
R1-144348, "Regulatory Requirements for Unlicensed Spectrum", Alcatel-Lucent et al., 3GPP TSG RAN WG1 #78bis, Oct. 2014.
3GPP TSG RAN WG1 #59bis, R1-100673, "Interpreting the Carrier Indicator Field", Jan. 2010.
3GPP TS 36.213, RAN WG1 V12.3.0, "Physical downlink control channel procedures", Sep. 26, 2014, pp. 139-152.
Panasonic, Further discussion on PDCCH with cross carrier operation [online], 3GPP TSG-RAN WG1 #59bis R1-100361, Internet<URL: http://www.3gpp.org/ftp/tsg_ran/WG1_RL1/TSGR1_59b/Docs/R1-100361.zip>, Jan. 22, 2010.

* cited by examiner

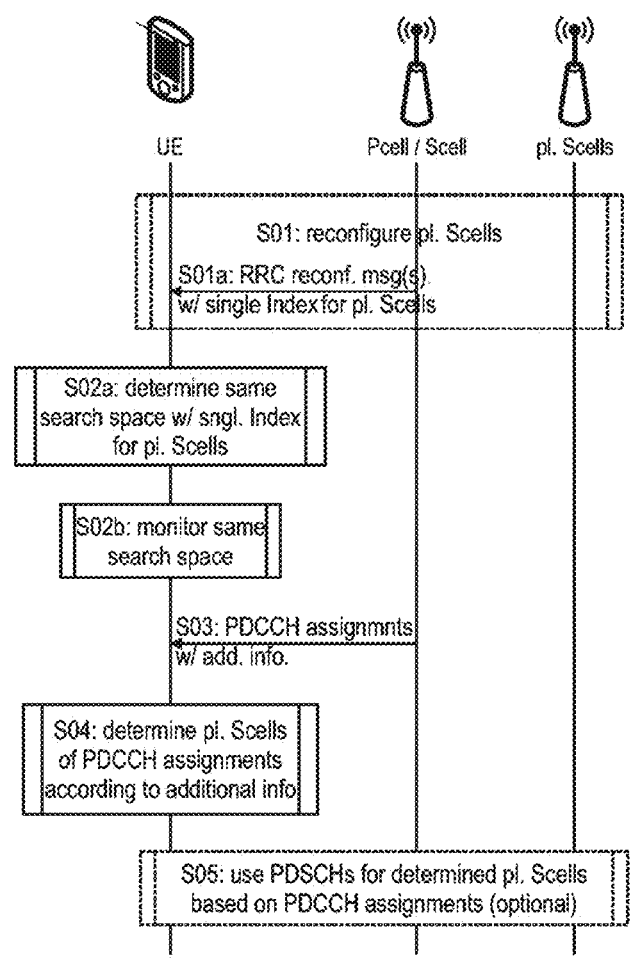

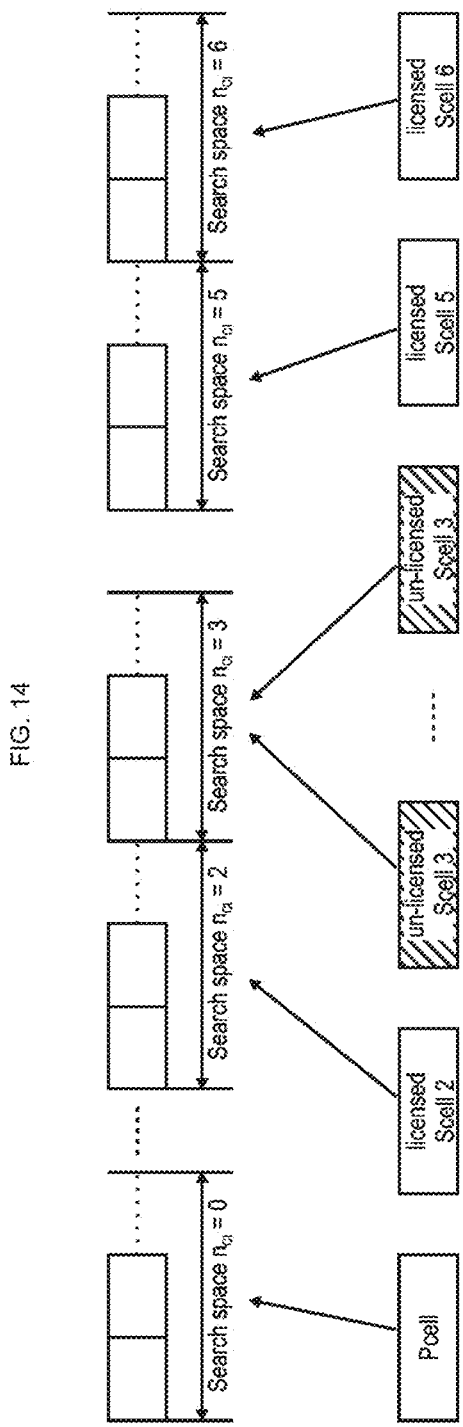

PHYSICAL DOWNLINK CONTROL CHANNEL, PDCCH, ASSIGNMENT PROCEDURE

BACKGROUND

1. Technical Field

The present disclosure relates to methods for receiving Physical Downlink Control Channel, PDCCH, assignments by a mobile station in a mobile communication system including a plurality of serving cells. The present disclosure is also providing a mobile station within the mobile communication system for participating and for performing the methods described herein.

2. Description of the Related Art

Long Term Evolution (LTE)

Third-generation (3G) mobile systems based on Wideband Code Division Multiple Access (WCDMA) radio-access technology is being deployed on a broad scale all around the world. A first step in enhancing or evolving this technology entails introducing High-Speed Downlink Packet Access (HSDPA) and an enhanced uplink, also referred to as High Speed Uplink Packet Access (HSUPA), giving a radio access technology that is highly competitive.

In order to be prepared for further increasing user demands and to be competitive against new radio access technologies, Third-Generation Partnership Project (3GPP) introduced a new mobile communication system which is called Long Term Evolution (LTE). LTE is designed to meet the carrier needs for high speed data and media transport as well as high capacity voice support for the next decade. The ability to provide high bit rates is a key measure for LTE.

The work item (WI) specification on Long-Term Evolution (LTE) called Evolved Universal Mobile Telecommunications System (UMTS) Terrestrial Radio Access (UTRA) and UMTS Terrestrial Radio Access Network (UTRAN) is finalized as Release 8 (LTE Rel. 8). The LTE system represents efficient packet-based radio access and radio access networks that provide full IP-based functionalities with low latency and low cost. In LTE, scalable multiple transmission bandwidths are specified such as 1.4, 3.0, 5.0, 10.0, 15.0, and 20.0 MHz, in order to achieve flexible system deployment using a given spectrum. In the downlink, Orthogonal Frequency Division Multiplexing (OFDM) based radio access was adopted because of its inherent immunity to multipath interference (MPI) due to a low symbol rate, the use of a cyclic prefix (CP) and its affinity to different transmission bandwidth arrangements. Single-carrier frequency division multiple access (SC-FDMA) based radio access was adopted in the uplink, since provisioning of wide area coverage was prioritized over improvement in the peak data rate considering the restricted transmit power of the user equipment (UE). Many key packet radio access techniques are employed including multiple-input multiple-output (MIMO) channel transmission techniques and a highly efficient control signaling structure is achieved in LTE Rel. 8/9.

LTE Architecture

The overall architecture is shown in FIG. 1 and a more detailed representation of the E-UTRAN architecture is given in FIG. 2. The E-UTRAN consists of an eNodeB, providing the E-UTRA user plane (PDCP/RLC/MAC/PHY) and control plane (RRC) protocol terminations towards the user equipment (UE). The eNodeB (eNB) hosts the Physical (PHY), Medium Access Control (MAC), Radio Link Control (RLC) and Packet Data Control Protocol (PDCP) layers that include the functionality of user-plane header-compression and encryption. It also offers Radio Resource Control (RRC) functionality corresponding to the control plane. It performs many functions including radio resource management, admission control, scheduling, enforcement of negotiated uplink Quality of Service (QoS), cell information broadcast, ciphering/deciphering of user and control plane data, and compression/decompression of downlink/uplink user plane packet headers. The eNodeBs are interconnected with each other by means of the X2 interface.

The eNodeBs are also connected by means of the S1 interface to the EPC (Evolved Packet Core), more specifically to the MME (Mobility Management Entity) by means of the S1-MME and to the Serving Gateway (SGW) by means of the S1-U. The S1 interface supports a many-to-many relation between MMEs/Serving Gateways and eNodeBs. The SGW routes and forwards user data packets, while also acting as the mobility anchor for the user plane during inter-eNodeB handovers and as the anchor for mobility between LTE and other 3GPP technologies (terminating S4 interface and relaying the traffic between 2G/3G systems and PDN GW). For idle state user equipments, the SGW terminates the downlink data path and triggers paging when downlink data arrives for the user equipment. It manages and stores user equipment contexts, e.g. parameters of the IP bearer service, network internal routing information. It also performs replication of the user traffic in case of lawful interception.

The MME is the key control-node for the LTE access-network. It is responsible for idle mode user equipment tracking and paging procedure including retransmissions. It is involved in the bearer activation/deactivation process and is also responsible for choosing the SGW for a user equipment at the initial attach and at time of intra-LTE handover involving Core Network (CN) node relocation. It is responsible for authenticating the user (by interacting with the HSS). The Non-Access Stratum (NAS) signaling terminates at the MME and it is also responsible for generation and allocation of temporary identities to user equipments. It checks the authorization of the user equipment to camp on the service provider's Public Land Mobile Network (PLMN) and enforces user equipment roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN. The MME also terminates the S6a interface towards the home HSS for roaming user equipments.

LTE Downlink Resource Grid

The downlink component carrier of a 3GPP LTE system is subdivided in the time-frequency domain in so-called sub-frames. In 3GPP LTE each sub-frame is divided into two downlink slots as shown in FIG. 3, wherein the first downlink slot includes the control channel region (PDCCH region) within the first OFDM symbols. Each sub-frame consists of a given number of OFDM symbols in the time domain (12 or 14 OFDM symbols in 3GPP LTE (Release 8)), wherein each OFDM symbol spans over the entire bandwidth of the component carrier. The OFDM symbols thus each consists of a number of modulation symbols transmitted on respective $N^{DL}_{RB}*N^{RB}_{SC}$ subcarriers as also shown in FIG. 4.

Assuming a multi-carrier communication system, e.g. employing OFDM, as for example used in 3GPP Long Term Evolution (LTE), the smallest unit of resources that can be assigned by the scheduler is one "resource block". A physical resource block (PRB) is defined as $N^{DL}_{symb}$ consecutive OFDM symbols in the time domain (e.g. 7 OFDM symbols) and $N^{RB}_{SC}$ consecutive subcarriers in the frequency domain as exemplified in FIG. 4 (e.g. 12 subcarriers for a component carrier). In 3GPP LTE (Release 8), a physical resource block thus consists of $N^{DL}_{symb}*N^{RB}_{SC}$ resource elements, corresponding to one slot in the time domain and 180 kHz in the frequency domain (for further details on the downlink resource grid, see for example 3GPP TS 36.211, "Evolved Universal Terrestrial Radio Access (E-UTRA); Physical Channels and Modulation (Release 8)", section 6.2, available at http://www.3gpp.org and incorporated herein by reference).

One sub-frame consists of two slots, so that there are 14 OFDM symbols in a sub-frame when a so-called "normal" CP (cyclic prefix) is used, and 12 OFDM symbols in a sub-frame when a so-called "extended" CP is used. For sake of terminology, in the following the time-frequency resources equivalent to the same $N^{RB}_{SC}$ consecutive subcarriers spanning a full sub-frame is called a "resource block pair", or equivalent "RB pair" or "PRB pair".

The term "component carrier" refers to a combination of several resource blocks in the frequency domain. In future, releases of LTE will no longer use to the term "component carrier". Instead, the terminology is changed to "cell", which refers to a combination of downlink and optionally uplink resources. The linking between the carrier frequency of the downlink resources and the carrier frequency of the uplink resources is indicated in the system information transmitted on the downlink resources. Similar assumptions for the component carrier structure apply to later releases too.

General Structure for Downlink Physical Channels

In LTE, within one DL sub-frame, the first 1 to 4 OFDM symbols are used for downlink control channel and downlink signal transmission (LTE control region). Downlink control signaling is carried out by three physical channels:
  PCFICH to indicate the number of OFDM symbols used for control signaling in a sub-frame (i.e. the size of the control channel region).
  PHICH which carries downlink ACK/NACK associated with UL data transmission.
  PDCCH which carries downlink scheduling assignments and uplink scheduling assignments.

LTE Downlink Resource Grid

In LTE, the transmitted signal in each slot is described by a resource grid of $N^{DL}_{RB}*N^{RB}_{SC}$ subcarriers and $N^{DL}_{symb}$ OFDM symbols. $N^{DL}_{RB}$ is the number of resource blocks within the bandwidth. The quantity $N^{DL}_{RB}$ depends on the downlink transmission bandwidth configured in the cell and shall fulfill $N^{min,DL}_{RB} \leq N^{DL}_{RB} \leq N^{max,DL}_{RB}$, where $N^{min,DL}_{RB}=6$ and $N^{max,DL}_{RB}=110$ are the smallest and largest downlink bandwidths, respectively, supported by the current version of this specification. $N^{RB}_{SC}$ is the number of subcarriers within one resource block. For normal cyclic prefix sub-frame structure, $N^{RB}_{SC}=12$ and $N^{DL}_{symb}=7$.

LTE DL Control Region

In LTE, within one DL sub-frame, the first 1 to 4 OFDM symbols are used for downlink control channel and downlink signal transmission (LTE control region). The downlink control channel includes PCFICH, PHICH and PDCCH. The downlink control signal includes CRS. FIG. 5 shows an example of LTE DL control region.

PCFICH

The physical control format indicator channel (PCFICH) indicates the size, i.e. the number of OFDM symbols of the DL control region. For $N^{DL}_{RB}>10$, the PCFICH value is between 0 and 3.

PHICH

Physical hybrid ARQ indicator channel carries the hybrid-ARQ ACK/NACK. The duration of PHICH, i.e. the number of OFDM symbols used for PHICH, is configured by higher layer. For normal PHICH, the duration is 1 OFDM symbol. For extended PHICH, the duration is 2 to 3 OFDM symbols. The duration of PHICH puts a lower limit on the size of the DL control region determined from the PCFICH value.

CRS

Cell-specific reference signals (CRS) are transmitted on one or several of antenna ports 0 to 3. In a normal sub-frame, CRS is distributed within the sub-frame across the whole bandwidth. In an MBSFN sub-frame, CRS shall only be transmitted in the non-MBSFN region, i.e. DL control region, of the MBSFN sub-frame.

PDCCH

PDCCH (Physical Downlink Control CHannel) carries scheduling assignments and other control information. A physical control channel is transmitted on an aggregation of one or several consecutive control channel elements (CCEs), where a control channel element corresponds to 9 resource element groups.

Resource-element groups (REGs) are used for defining the mapping of control channels to resource elements. Each REG consists of four consecutive resource elements (except reference signal) in the same OFDM symbol. REGs exist in the first 1 to 4 OFDM symbols within one sub-frame, which consists of two slots. Each R-PDCCH is mapped to REGs in a distributed way.

PDCCH Search Space

The UE shall monitor a set of PDCCH candidates on the serving cell for control information in every non-DRX sub-frame, where monitoring implies attempting to decode each of the PDCCHs in the set according to all the monitored DCI formats. The set of PDCCH candidates to monitor is defined in terms of search spaces.

UE monitors two types of search space: UE specific search space and common search space. Both UE specific search space and common search space have different aggregation levels.—In UE specific search space, there are {6, 6, 2, 2} number of PDCCH candidates at aggregation level {1, 2, 4, 8} and the PDCCH candidates of each aggregation level are consecutive in CCEs. The starting CCE index of the first PDCCH candidate in aggregation level L is decided by $Y_k*L$. k is the sub-frame number and $Y_k$ is decided by k and UE ID. Therefore, the positions of CCEs in UE specific search space are decided by UE ID to reduce the overlap of PDCCH UE specific search space from different UEs and are randomized from sub-frame to sub-frame to randomize the interference from PDCCH in neighboring cells.

In common search space, there are {4, 2} number of PDCCH candidates at aggregation level {4, 8}. The first PDCCH candidate in aggregation level L starts from CCE index 0. Therefore, all the UEs monitor the same common search space.

PDCCH for system information is transmitted in common search space, so that all the UEs can receive system information by monitoring common search space.

Component Carrier Structure in LTE

The downlink component carrier of a 3GPP LTE system is subdivided in the time-frequency domain in so-called sub-frames. In 3GPP LTE each sub-frame is divided into two downlink slots as shown in FIG. 3, wherein the first downlink slot includes the control channel region (PDCCH region) within the first OFDM symbols. Each sub-frame consists of a given number of OFDM symbols in the time domain (12 or 14 OFDM symbols in 3GPP LTE (Release 8)), wherein each of OFDM symbol spans over the entire bandwidth of the component carrier. The OFDM symbols thus each consist of a number of modulation symbols transmitted on respective $N^{DL}_{RB} * N^{RB}_{SC}$ subcarriers as also shown in FIG. 4.

Assuming a multi-carrier communication system, e.g. employing OFDM, as for example used in 3GPP Long Term Evolution (LTE), the smallest unit of resources that can be assigned by the scheduler is one "resource block". A physical resource block is defined as $N^{DL}_{symb}$ consecutive OFDM symbols in the time domain and $N^{RB}_{SC}$ consecutive subcarriers in the frequency domain as exemplified in FIG. 4. In 3GPP LTE (Release 8), a physical resource block thus consists of $N^{DL}_{symb} * N^{RB}_{SC}$ resource elements, corresponding to one slot in the time domain and 180 kHz in the frequency domain (for further details on the downlink resource grid, see for example 3GPP TS 36.211, "Evolved Universal Terrestrial Radio Access (E-UTRA); Physical Channels and Modulation (Release 8)", version 8.9.0 or 9.0.0, section 6.2, available at http://www.3gpp.org and incorporated herein by reference). The term "component carrier" refers to a combination of several resource blocks. In future, releases of LTE will no longer use the term "component carrier". Instead, the terminology will be changed to "cell", which refers to a combination of downlink and optionally uplink resources. The linking between the carrier frequency of the downlink resources and the carrier frequency of the uplink resources is indicated in the system information transmitted on the downlink resources.

Carrier Aggregation in LTE-A

According to TS36.300 va.2.0 [5], in Carrier Aggregation (CA), two or more Component Carriers (CCs) are aggregated in order to support wider transmission bandwidths up to 100 MHz. A UR may simultaneously receive or transmit on one or multiple CCs depending on its capabilities.

When CA is configured, a UE only has one RRC connection with the network. At RRC connection reestablishment/handover, one serving cell provides the NAS mobility information and the security input. The serving cell is referred as a Primary Cell (PCell). Therefore, UE always has one PCell. Besides the PCell, other serving cells can be added to or released from one UE. They are called Secondary Cells (SCells).

In Rel-10, maximum four SCells can be added to one UE. Each SCell is configured with a serving cell index when the SCell is added to one UE. The PCell always has the serving cell index 0. As a result, maximum five serving cells can be configured for one UE. When CA is configured, a UE may be scheduled over multiple serving cells simultaneously. Cross-carrier scheduling with the Carrier Indicator Field (CIF) allows the PDCCH of a serving cell to schedule resources on another serving cell but with the following restrictions:

Cross-carrier scheduling does not apply to the PCell, i.e. the PCell is always scheduled via its PDCCH;

When the PDCCH of an SCell is configured, cross-carrier scheduling does not apply to this SCell i.e. it is always scheduled via its PDCCH;

When the PDCCH of an SCell is not configured, cross-carrier scheduling applies and this SCell is always scheduled via the PDCCH of one other serving cell. Cross carrier scheduling configuration configures for each SCell whether the SCell is scheduled by PDCCH on its own carrier or by PDCCH on another carrier and if SCell is scheduled by PDCCH on its own carrier, whether CIF field exists in PDCCH.

Search Space in LTE-A

For each serving cell on which PDCCH is monitored, the CCEs corresponding to PDCCH candidate m of the search space $S^{(L)}_k$ are given by $$L\{(Y_k+m') \bmod \lfloor N_{CCE,k}/L \rfloor\}+i$$

where $Y_k$ is defined the same as in LTE and is given below, i=0, . . . , L−1. For the common search space m'=m. For the PDCCH UE specific search space, for the serving cell on which PDCCH is monitored, if the monitoring UE is configured with carrier indicator field then $m'=m+M^{(L)} \cdot n_{CI}$ where $n_{CI}$ is the carrier indicator field value, else if the monitoring UE is not configured with carrier indicator field then m'=m, where m=0, . . . , $M^{(L)}$−1. $M^{(L)}$ is the number of PDCCH candidates to monitor in the given search space. Note that carrier indicator field value is the same as serving cell index.

For the common search spaces, $Y_k$ is set to 0 for the two aggregation levels L=4 and L=8.

For the UE-specific search space $S^{(L)}_k$ at aggregation level L, the variable $Y_k$ is defined by $Y_k=(A \cdot Y_{k-1}) \bmod D$.

Therefore, on a serving cell where PDCCH is monitored, if another serving cell is scheduled on this serving cell, the search space of the scheduled serving cell is determined by carrier indicator field value. Carrier indicator field value is the same as serving cell index. Therefore, carrier indicator field value has the range of 0-7, but maximum five values will be configured for one UE. As a result, maximum five search spaces will be monitored. Each search space corresponds to one serving cell. However, PDCCH for one serving cell can be scheduled on the search space of another serving cell if the DCI format for the PDCCH is the same on two serving cells. In this case, to indicate which serving cell is scheduled, CIF in PDCCH can indicate the scheduled serving cell. CIF can also be useful when the search spaces from different serving cells overlap with each other. Currently $n_{CI}$ equals CIF, which equals a serving cell index.

Layer 1/Layer 2 (L1/L2) Control Signaling

In order to inform the scheduled users about their allocation status, transport format and other transmission-related information (e.g. HARQ information, transmit power control (TPC) commands), L1/L2 control signaling is transmitted on the downlink along with the data. L1/L2 control signaling is multiplexed with the downlink data in a subframe, assuming that the user allocation can change from subframe to subframe. It should be noted that user allocation might also be performed on a TTI (Transmission Time Interval) basis, where the TTI length can be a multiple of the subframes. The TTI length may be fixed in a service area for all users, may be different for different users, or may even by dynamic for each user. Generally, the L1/L2 control signaling needs only to be transmitted once per TTI. Without loss of generality, the following assumes that a TTI is equivalent to one subframe.

The L1/L2 control signaling is transmitted on the Physical Downlink Control Channel (PDCCH). A PDCCH carries a message as a Downlink Control Information (DCI), which in most cases includes resource assignments and other control information for a mobile terminal or groups of UEs. In general, several PDCCHs can be transmitted in one subframe.

It should be noted that in 3GPP LTE, assignments for uplink data transmissions, also referred to as uplink scheduling grants or uplink resource assignments, are also transmitted on the PDCCH. Furthermore, Release 11 introduced an EPDCCH that fulfills basically the same function as the PDCCH, i.e. conveys L1/L2 control signaling, even though the detailed transmission methods are different from the PDCCH. Further details can be found particularly in the current versions of 3GPP TS 36.211 and 3GPP TS36.213 "Evolved Universal Terrestrial Radio Access (E-UTRA); Physical layer procedures", incorporated herein by reference. Consequently, most items outlined in the background and the embodiments apply to PDCCH as well as EPDCCH, or other means of conveying L1/L2 control signals, unless specifically noted.

Generally, the information sent on the L1/L2 control signaling for assigning uplink or downlink radio resources (particularly LTE(-A) Release 10) can be categorized to the following items:

User identity, indicating the user that is allocated. This is typically included in the checksum by masking the CRC with the user identity;

Resource allocation information, indicating the resources (Resource Blocks, RBs) on which a user is allocated. Alternatively this information is termed resource block assignment (RBA). Note, that the number of RBs on which a user is allocated can be dynamic;

Carrier indicator, which is used if a control channel transmitted on a first carrier assigns resources that concern a second carrier, i.e. resources on a second carrier or resources related to a second carrier; (cross carrier scheduling);

Modulation and coding scheme that determines the employed modulation scheme and coding rate;

HARQ information, such as a new data indicator (NDI) and/or a redundancy version (RV) that is particularly useful in retransmissions of data packets or parts thereof;

Power control commands to adjust the transmit power of the assigned uplink data or control information transmission;

Reference signal Information such as the applied cyclic shift and/or orthogonal cover code index, which are to be employed for transmission or reception of reference signals related to the assignment;

Uplink or downlink assignment index that is used to identify an order of assignments, which is particularly useful in TDD systems;

Hopping information, e.g. an indication whether and how to apply resource hopping in order to increase the frequency diversity;

CSI request, which is used to trigger the transmission of channel state information in an assigned resource; and Multi-cluster information, which is a flag used to indicate and control whether the transmission occurs in a single cluster (contiguous set of RBs) or in multiple dusters (at least two non-contiguous sets of contiguous RBs). Multi-duster allocation has been introduced by 3GPP LTE-(A) Release 10.

It is to be noted that the above listing is non-exhaustive, and not all mentioned information items need to be present in each PDCCH transmission depending on the DCI format that is used.

Downlink control information occurs in several formats that differ in overall size and also in the information contained in their fields. The different DCI formats that are currently defined for LTE are as follows and described in detail in 3GPP TS 36.212, "Multiplexing and channel coding", section 5.3.3.1 (current version v12.2.0 available at http://www.3gpp.org and incorporated herein by reference).

In addition, for further information regarding the DCI formats and the particular information that is transmitted in the DCI, please refer to the mentioned technical standard or to LTE—The UMTS Long Term Evolution—From Theory to Practice, Edited by Stefanie Sesia, Issam Toufik, Matthew Baker, Chapter 9.3, incorporated herein by reference.

Format 0: DCI Format 0 is used for the transmission of resource grants for the PUSCH, using single-antenna port transmissions in uplink transmission mode 1 or 2. Format 1: DCI Format 1 is used for the transmission of resource assignments for single codeword PDSCH transmissions (downlink transmission modes 1, 2 and 7).

Format 1A: DCI Format 1A is used for compact signaling of resource assignments for single codeword PDSCH transmissions, and for allocating a dedicated preamble signature to a mobile terminal for contention-free random access (for all transmissions modes).

Format 1B: DCI Format 1B is used for compact signaling of resource assignments for PDSCH transmissions using closed loop precoding with rank-1 transmission (downlink transmission mode 6). The information transmitted is the same as in Format 1A, but with the addition of an indicator of the precoding vector applied for the PDSCH transmission.

Format 1C: DCI Format 1C is used for very compact transmission of PDSCH assignments. When Format 1C is used, the PDSCH transmission is constrained to using QPSK modulation. This is used, for example, for signaling paging messages and broadcast system information messages.

Format 1 D: DCI Format 1 D is used for compact signaling of resource assignments for PDSCH transmission using multi-user MIMO. The information transmitted is the same as in Format 1 B, but instead of one of the bits of the precoding vector indicators, there is a single bit to indicate whether a power offset is applied to the data symbols. This feature is needed to show whether or not the transmission power is shared between two UEs. Future versions of LTE may extend this to the case of power sharing between larger numbers of UEs.

Format 2: DCI Format 2 is used for the transmission of resource assignments for PDSCH for closed-loop MIMO operation (transmission mode 4).

Format 2A: DCI Format 2A is used for the transmission of resource assignments for PDSCH for open-loop MIMO operation. The information transmitted is the same as for Format 2, except that if the eNodeB has two transmit antenna ports, there is no precoding information, and for four antenna ports two bits are used to indicate the transmission rank (transmission mode 3).

Format 2B: Introduced in Release 9 and is used for the transmission of resource assignments for PDSCH for dual-layer beamforming (transmission mode 8).

Format 2C: Introduced in Release 10 and is used for the transmission of resource assignments for PDSCH for closed-loop single-user or multi-user MIMO operation with up to 8 layers (transmission mode 9).

Format 2D: introduced in Release 11 and used for up to 8 layer transmissions; mainly used for COMP (Cooperative Multipoint) (transmission mode 10).

Format 3 and 3A: DCI Formats 3 and 3A are used for the transmission of power control commands for PUCCH and PUSCH with 2-bit or 1-bit power adjustments respectively. These DCI formats contain individual power control commands for a group of UEs.

Format 4: DCI Format 4 is used for the scheduling of the PUSCH, using closed-loop spatial multiplexing transmissions in uplink transmission mode 2.

The following table gives an overview of some available DCI formats and the typical number of bits, assuming for illustration purposes a system bandwidth of 50 RBs and four antennas at the eNodeB, especially without cross-carrier scheduling or carrier aggregation. The number of bits indicated in the right column includes the bits for the CRC of the particular DCI.

| DCI format | Purpose | Number of bits including CRC |
|---|---|---|
| 0 | PUSCH grants | 43 |
| 1 | PDSCH assignments with a single codeword | 47 |
| 1A | PDSCH assignments using a compact format | 43 |
| 1B | PDSCH assignments for rank-1 transmission | 46 |
| 1C | PDSCH assignments using a very compact format | 29 |
| 1D | PDSCH assignments for multi-user MIMO | 46 |
| 2 | PDSCH assignments for closed-loop MIMO operation | 62 |
| 2A | PDSCH assignments for open-loop MIMO operation | 58 |
| 2B | PDSCH assignments for dual-layer beamforming | 57 |
| 2C | PDSCH assignments for closed-loop single-user or multiuser MIMO operation | 58 |
| 2D | PDSCH assignments for closed-loop single-user or multi-user MIMO operation COMP | 61 |
| 3 | Transmit Power Control (TPC) commands for multiple users for PUCCH and PUSCH with 2-bit power adjustments | 43 |
| 3A | Transmit Power Control (TPC) commands for multiple users for PUCCH and PUSCH with 1-bit power adjustments | 43 |
| 4 | PUSCH grants | 52 |

Additional formats may be defined in the future.

It should be noted that the size is generally a function of the system bandwidth, and that the resource allocation information may occupy a substantial part of the DCI payload.

Information element multiplexing (refers to the multiplexing of the particular information elements making up the one DCI)

CRC attachment

Channel coding

Rate matching

In order that the UE can identify whether it has received a PDCCH transmission correctly, error detection is provided by means of a 16-bit CRC appended to each PDCCH (i.e. DCI). Furthermore, it is necessary that the UE can identify which PDCCH(s) are intended for it. This could in theory be achieved by adding an identifier to the PDCCH payload; however, it turns out to be more efficient to scramble the CRC with the "UE identity", which saves the additional overhead. The CRC may be calculated and scrambled as defined in detail by 3GPP in TS 36.212, Section 5.3.3.2 "CRC attachment", describing how error detection is provided on DCI transmissions through a Cyclic Redundancy Check (CRC). In summary, the entire payload is used to calculate the CRC parity bits, which are then attached. In case UE transmit antenna selection is not configured or applicable, after attachment, the CRC parity bits are scrambled with the corresponding RNTI. Correspondingly, the UE descrambles the CRC by applying the "UE identity" and, if no CRC error is detected, the UE determines that the PDCCH carries control information intended for itself. The terminology of "masking" and "de-masking" is used as well, for the above-described process of scrambling a CRC with an identity.

Further details in the respect are omitted herewith although the relevant passages are incorporated hereby by reference from TS 36.212, Section 5.3.3.2. In the following an overview of the particular content of the various DCI Formats is given, according to 3GPP TS 36.212 (current version 12.2.0) as of subclause 5.3.3.1 which details are incorporated herein by reference.

DCI Format 0: Carrier Indicator, Flag for format 0/format 1A differentiation, Frequency Hopping Flag, Resource Block Assignment and hopping resource allocation, Modulation and Coding Scheme and Redundancy Version, New Data indicator, TPC Command for scheduled PUSCH, Cyclic Shift for DM RS and OCC index, UL index, Downlink Assignment Index (DAI), CSI request, SRS request, Resource Allocation Type DCI Format 1: Carrier Indicator, Resource allocation header, Resource Block Assignment, Modulation and Coding scheme, HARQ process number, New Data Indicator, Redundancy Version, TPC command for PUCCH, Downlink Assignment Index, HARQ-ACK resource offset DCI Format 1A: Carrier Indicator, Flag for format 0/format 1A differentiation, localized/distributed VRB assignment flag, Resource Block Assignment, Modulation and Coding Scheme, HARQ process number, New Data Indicator, Redundancy Version, TPC command for PUCCH, Downlink Assignment Index, SRS request, HARQ-ACK resource offset DCI format 1B: Carrier Indicator, localized/distributed VRB assignment flag, Resource Block Assignment, Modulation and Coding Scheme, HARQ process number, New Data Indicator, Redundancy Version, TPC command for PUCCH, Downlink Assignment Index, TPMI information for pre-coding, PMI confirmation for pre-coding, HARQ-ACK resource offset DCI Format 1C: gap value, Resource Block Assignment, Modulation and Coding Scheme, information for MCCH change notification, UL/DL configuration indication, UL/DL configuration number DCI Format 1D: Carrier Indicator, localized/distributed VRB assignment flag, Resource Block Assignment, Modulation and Coding Scheme, HARQ process number, New Data Indicator, Redundancy Version, TPC command for PUCCH, Downlink Assignment Index, TPMI information for pre-coding, Downlink power offset, HARQ-ACK resource offset DCI Format 2: Carrier Indicator, Resource allocation header, Resource Block Assignment, TPC command for PUCCH, Downlink Assignment Index, HARQ process number, Transport Block to codeword swap flag, respectively Modulation and Coding Scheme, New Data Indicator, and Redundancy Version for transport block 1 and 2, Pre-coding information, HARQ-ACK resource offset DCI Format 2A: Carrier Indicator, Resource allocation header, Resource Block Assignment, TPC command for PUCCH, Downlink Assignment Index, HARQ process number, Transport Block to codeword swap flag, respectively Modulation and Coding Scheme, New Data Indicator, and Redundancy Version for transport block 1 and 2, Pre-coding information, HARQ-ACK resource offset DCI Format 2B: Carrier Indicator, Resource allocation header, Resource Block Assignment, TPC command for PUCCH, Downlink Assignment Index, HARQ process number, Scrambling Identity, SRS request, respectively Modulation and Coding Scheme, New Data Indicator, and Redundancy Version for transport block 1 and 2, HARQ-ACK resource offset DCI Format 2C: Carrier Indicator, Resource allocation header, Resource Block Assignment, TPC command for PUCCH, Downlink Assignment Index, HARQ process number, Antenna port(s), scrambling identity and number of layers, SRS request, respectively Modulation and Coding Scheme, New Data Indicator, and Redundancy Version for transport block 1 and 2, HARQ-ACK resource offset DCI Format 2D: Carrier Indicator, Resource allocation header, Resource Block Assignment, TPC command for PUCCH, Downlink Assignment Index, HARQ process number, Antenna port(s), scrambling identity and number of layers, SRS request, respectively Modulation and Coding Scheme, New Data Indicator, and Redundancy Version for transport block 1 and 2, PDSCH RE Mapping and Quasi-Co-Location Indicator, HARQ-ACK resource offset DCI Format 3: TPC command number DCI Format 3A: TPC command number DCI Format 4: Carrier Indicator, Resource Block assignment, TPC command for scheduled PUSCH, Cyclic shift for DM RS and OCC index, UL index, Downlink Assignment Index (DAI), CSI request, SRS request, Resource allocation type, respectively Modulation and Coding Scheme, Redundancy Version, and New Data Indicator for transport blocks 1 and 2, Precoding information and number of layers It may be noted that not all elements listed above are always present; the presence of some of the elements may be configurable e.g. by RRC parameters. More details regarding the DCI formats and the different fields of the DCI content mentioned above can be found in TS 36.212 v12.2.0 incorporated herein by reference.

Physical Downlink Control Channel (PDCCH)

As already explained, a PDCCH carries messages as DCIs i.e. DCI messages. Each PDCCH is transmitted on an aggregation of one or more so called Control Channel Elements (CCEs), where each CCE corresponds to nine Resource Element Groups (REGs i.e. sets of four physical resource elements). REGs constituting CCEs are not consecutive, and CCEs are distributed in frequency over entire bandwidth. Note that CCEs are spread in the frequency domain to achieve frequency diversity. Four PDCCH formats are supported as listed in the following table, which also shows the corresponding possible CCE aggregation levels.

| PDCCH format | Number of CCEs | Number of REGs | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

CCEs are numbered and used consecutively, and to simplify the decoding process, a PDCCH with a format consisting of n CCEs may only start with a CCE with a number equal to a multiple of n.

The number of available CCEs in a cell varies; it may be semi-static (System bandwidth, PHICH configuration) or dynamic (PCFICH).

The number of CCEs used for transmission of a particular PDCCH is determined by the eNodeB according to channel conditions. For example, if the PDCCH is intended for a mobile terminal with a good downlink channel (e.g. close to the eNodeB), then one CCE is likely to be sufficient. However, for a mobile terminal with a poor channel (e.g. near the cell border), eight CCEs may be required in order to achieve sufficient robustness. In addition, the power level of a PDCCH may be adjusted to match the channel conditions.

It should be noted that for EPDCCH, the basic units for transmission are called ECCE and EREG, respectively. The corresponding numerology and transmission is different from the PDCCH, and can be further looked up especially in 3GPP TS 36.211 incorporated herein by reference.

In detecting a PDCCH, the mobile terminal shall monitor a set of PDCCH candidates for control information in every non-DRX subframe, where monitoring refers to the process of attempting to decode each of PDCCHs in the set according to all DCI formats, as will be explained in more detail later; the term "blind decoding" is also used in the respect.

Blind Decoding of PDCCHs at the User Equipment

In 3GPP LTE (Release 8/9), the user equipment attempts to detect DCI(s) within the PDCCH using so-called "blind decoding". This means that there is no associated control signaling that would indicate the CCE aggregation size or modulation and coding scheme for the PDCCHs signaled in the downlink, but the user equipment tests for all possible combinations of CCE aggregation sizes and modulation and coding schemes, and confirms the successful decoding of a PDCCH based on the RNTI. To further limit complexity a common and dedicated search space in the control signaling region of the LTE component carrier is defined in which the user equipment searches for PDCCHs, i.e. performs the blind decoding. Above, a detailed explanation on how to calculate search spaces is provided.

The Physical Control Format Indicator Channel (PCFICH) carries a Control Format Indicator (CFI) which indicates the number of OFDM symbols used for transmission of control channel information in each subframe. The eNodeB is capable of transmitting multiple PDCCHs in a subframe. The transmissions are organized such that a UE can locate the PDCCHs intended for it, while at the same time making efficient use of the resources allocated for PDCCH transmissions.

A simple approach, at least for the eNodeB, would be to allow the eNodeB to place any PDCCH anywhere in the PDCCH resources (or CCEs) indicated by the PCFICH. In this case, the UE would need to check all possible PDCCH locations, PDCCH formats and DCI formats, and act on those messages with correct CRCs (taking into account that the CRC is scrambled with a UE identity). Carrying out such a blind decoding of all the possible combinations would require the UE to make many PDCCH decoding attempts in every subframe. For small system bandwidths the computational load might be reasonable, but for large system bandwidths with a large number of possible PDCCH locations, it would become a significant burden, leading to excessive power consumption in the UE receiver.

The alternative approach adopted for LTE is to define for each UE a limited set of CCE locations where a PDCCH may be placed. Such a constraint may lead to some limitations as to which UEs can be sent PDCCHs within the same subframe, which would thus restrict the UEs to which the eNodeB could grant resources. Therefore, it is important for good system performance that the set of possible PDCCHs locations available for each UE is not too small. The set of CCE locations in which the UE may find its PDCCHs can be considered as a search space. In LTE the search space is of different size for each PDCCH (DCI) format. Moreover, separate dedicated and common search spaces are defined, where a dedicated (also termed UE-specific) search space is configured for each UE individually, while all UEs are informed of the extent of the common search space. Note that the dedicated and common search spaces may overlap for a given UE. Up to Release 12, the common search space is only supported on PDCCH, while the dedicated search space is supported on PDCCH as well as on EPDCCH.

With small search spaces it is quite possible in a given subframe that the eNodeB cannot find CCE resources to send PDCCHs to all the UEs that it would like to, because, having assigned some CCE locations, the remaining CCE locations are not in the search space of a particular UE. To minimize the possibility of such a blocking persisting into the next subframe, a UE-specific hopping sequence (derived from the UE identity) is applied to the starting positions of the UE-specific search spaces from subframe to subframe.

The starting location of the UE specific search space on PDCCH is usually determined by a hashing function based e.g. on the slot number within the radio frame, the RNTI value and other parameters. The UE specific search space allows aggregation levels of 1, 2, 4 and 8 CCEs. On EPDCCH, the location is more configurable, and the EPDCCH supports aggregation levels beyond 8.

Further information is provided in LTE—The UMTS Long Term Evolution—From Theory to Practice, Edited by Stefanie Sesia, Issam Toufik, Matthew Baker, Chapter 9.3, incorporated herein by reference.

Resource Allocation Types

Conveying indications of physical layer resource allocation is one of the major functions of the PDCCHs. While the exact use of the PDCCHs depends on the other algorithms implemented in the eNodeB, it is nevertheless possible to outline some general principles of typical operation. In each subframe, PDCCHs indicate the frequency domain resource allocations. Resource allocations are normally localized, meaning that a physical resource block (PRB) in the first half of a subframe is paired with the PRB at the same frequency in the second half of the subframe.

The main design challenge for the signaling of frequency domain resource allocations is to find a good compromise between flexibility and signaling overhead. The most flexible, and arguably the simplest, approach is to send each UE a bitmap in which each bit indicates a particular PRB. This would work well for small system bandwidths, but for large system bandwidths (i.e. up to 110 PRBs) the bitmap would need 110 bits, which would be a prohibitive overhead—particularly for small packets, where the PDCCH message could be larger than the data packet. One possible solution would be to send a combined resource allocation message to all UEs, but this was rejected on the grounds of the high power needed to reach all UEs reliably, including those at the cell edges. The approaches adopted in the LTE are as follows. Different resource allocation types 0, 1, and 2 are defined with different characteristics.

Resource allocation Type 0: In resource allocations of Type 0, a bitmap indicates the resource block groups (RBGs) which are allocated to the scheduled UE, where an RBG is a set of consecutive PRBs. The RBG size is a function of the system bandwidth; i.e. with an increased downlink bandwidth the RBG size increases non-linearly.

Resource allocation Type 1: In resource allocations of Type 1, individual PRBs can be addressed, but only within a subset of the PRBs available in the component carrier or cell. The bitmap used is slightly smaller than for Type 0, since some bits are used to indicate which subset of the RBG is addressed, and a shift in the position of the bitmap. The total number of bits (including the use of additional flags) is the same as for Type 0. The motivation for providing this method of resource allocation is flexibility in spreading the resources across the frequency domain to exploit the frequency diversity.

Resource allocation Type 2: In resource allocations of Type 2, the resource allocation information indicates a contiguous set of Virtual Resource Blocks, VRBs, using either localized or distributed mapping to PRBs as indicated by a 1-bit flag in the resource allocation message. PRB allocations may vary from a single PRB up to a maximum number of PRBs spanning the system bandwidth. A Type 2 resource allocation field consists of a resource indication value (RIV) corresponding to a starting RB ($RB_{START}$) and a length in terms of contiguously allocated RBs ($L_{CRBs}$)

More specific information on the different resource allocation types can be found in TS 36.213, clause 7.1.6 "Resource Allocation" (current version 12.3.0) incorporated herein by reference.

Additionally, uplink resource allocation types 0 and 1 are supported for PDCCH/EPDCCH with uplink DCI format. More specific information on the different resource allocation types for uplink can be found in TS 36.213, clause 8.1 "Resource allocation for PDCCH/EPDCCH with uplink DCI format" (current version 12.3.0) incorporated herein by reference.

LTE on Unlicensed Bands—Licensed Assisted Access

In September 2014, 3GPP initiated a new study item on LTE operation on unlicensed spectrum. The reason for extending LTE to unlicensed bands is the ever-growing demand for wireless broadband data in conjunction with the limited amount of licensed bands. Unlicensed spectrum therefore is more and more considered by cellular operators as a complementary tool to augment their service offering. The advantage of LTE in unlicensed bands compared to relying on other radio access technologies (RAT) such as Wi-Fi is that complementing the LTE platform with unlicensed spectrum access enables operators and vendors to leverage the existing or planned investments in LTE/EPC hardware in the radio and core network.

However, it has to be taken into account that unlicensed spectrum access can never match the qualities of licensed spectrum due to the inevitable coexistence with other radio access technologies (RATs) in the unlicensed spectrum. LTE operation on unlicensed bands will therefore at least in the beginning be considered rather a complement to LTE on licensed spectrum than stand-alone operation on unlicensed spectrum. Based on this assumption, 3GPP established the term Licensed Assisted Access (LAA) for the LTE operation on unlicensed bands in conjunction with at least one licensed band. Future stand-alone operation of LTE on unlicensed spectrum without relying on LAA however shall not be excluded.

The current intended general LAA approach at 3GPP is to make use of the already specified Rel-12 carrier aggregation (CA) framework as much as possible where the CA framework configuration includes a so-called primary cell (PCell) carrier and one or more secondary cell (SCell) carriers. CA supports in general both self-scheduling of cells (scheduling information and user data are transmitted on the same component carrier) and cross-carrier scheduling between cells (scheduling information in terms of PDCCH/EPDCCH and user data in terms of PDSCH/PUSCH are transmitted on different component carriers).

At present, the basic approach envisioned at 3GPP is that the PCell will be operated on a licensed band while one or more SCells will be operated on unlicensed bands. The benefit of this strategy is that the PCell can be used for reliable transmission of control messages and user data with high quality of service (QoS) demands, such as for example voice and video, while a PCell on unlicensed spectrum might yield, depending on the scenario, to some extent significant QoS reduction due to inevitable coexistence with other RATs.

It has been agreed during RAN1#78bis, that the LAA investigation at 3GPP will focus on unlicensed bands at 5 GHz, although no final decision is taken. One of the most critical issues is therefore the coexistence with Wi-Fi (IEEE 802.11) systems operating at these unlicensed bands. In order to support fair coexistence between LTE and other technologies such as Wi-Fi as well as fairness between different LTE operators in the same unlicensed band, the channel access of LTE for unlicensed bands has to abide by certain sets of regulatory rules which depend on region and considered frequency band; a comprehensive description of the regulatory requirements for operation on unlicensed bands at 5 GHz is given in R1-144348, "Regulatory Requirements for Unlicensed Spectrum", Alcatel-Lucent et al., RAN1#78bis, September 2014 incorporated herein by reference. Depending on region and band, regulatory requirements that have to be taken into account when designing LAA procedures comprise Dynamic Frequency Selection (DFS), Transmit Power Control (TPC), Listen Before Talk (LBT) and discontinuous transmission with limited maximum transmission duration. The intention of the 3GPP is to target a single global framework for LAA which basically means that all requirements for different regions and bands at 5 GHz have to be taken into account for the system design.

DFS is required for certain regions and bands in order to detect interference from radar systems and to avoid co-channel operation with these systems. The intention is furthermore to achieve a near-uniform loading of the spectrum. The DFS operation and corresponding requirements are associated with a master-slave principle. The master shall detect radar interference, and can however rely on another device, that is associated with the master, to implement the radar detection.

The operation on unlicensed bands at 5 GHz is in most regions limited to rather low transmit power levels compared to the operation on licensed bands resulting in small coverage areas. Even if the licensed and unlicensed carriers were to be transmitted with identical power, usually the unlicensed carrier in the 5 GHz band would be expected to support a smaller coverage area than a licensed cell in the 2 GHz band due to increased path loss and shadowing effects for the signal. A further requirement for certain regions and bands is the use of TPC in order to reduce the average level of interference caused to other devices operating on the same unlicensed band.

Following the European regulation regarding LBT, devices have to perform a Clear Channel Assessment (CCA) before occupying the radio channel. It is only allowed to initiate a transmission on the unlicensed channel after detecting the channel as free based on energy detection. The equipment has to observe the channel for a certain minimum during the CCA. The channel is considered occupied if the detected energy level exceeds a configured CCA threshold. If the channel is classified as free, the equipment is allowed to transmit immediately. The maximum transmit duration is thereby restricted in order to facilitate fair resource sharing with other devices operating on the same band.

Considering the different regulatory requirements, it is apparent that the LTE specification for operation on unlicensed bands will require several changes compared to the current Rel-12 specification that is limited to licensed band operation.

SUMMARY

One non-limiting and exemplary embodiment provides a mobile terminal for receiving Physical Downlink Control CHannel, PDCCH, assignments in a mobile communication system. The independent claims provide non-limiting and exemplary embodiments. Advantageous embodiments are subject to the dependent claims.

In one general aspect, the techniques disclosed here feature a mobile station for receiving Physical Downlink Control CHannel, PDCCH, assignments in a mobile communication system including a plurality of serving cells. In case the mobile station is to be configured with at least two serving cells among the plurality of serving cells, the at least two serving cells having different serving cell indices, the mobile station monitors, for the at least two serving cells, a same set of candidates for PDCCH assignments defining a same search space which is specific to the mobile station and which is determined independently of the indices of the at least two serving cells with which the mobile station is to be configured, and the mobile station receives, for the at least two serving cells, PDCCH assignments from among the monitored same set of candidates using carrier indicator field, CIF, values in the received PDCCH assignments for identifying the at least two serving cells with which the mobile station is to be configured. The CIF values, included in the received PDCCH assignments, correspond to the respective indices of the at least two serving cells with which the mobile station is to be configured.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 13 shows an exemplary sequence diagram of the reception of PDCCH assignments by a mobile station according to a second exemplary implementation of a further embodiment; and FIG. 14 illustrates an example of the second exemplary implementation of the PDCCH assignment mechanism when applied to a mixed deployment of LAA and LTE scenario.

DETAILED DESCRIPTION

Figure 1:
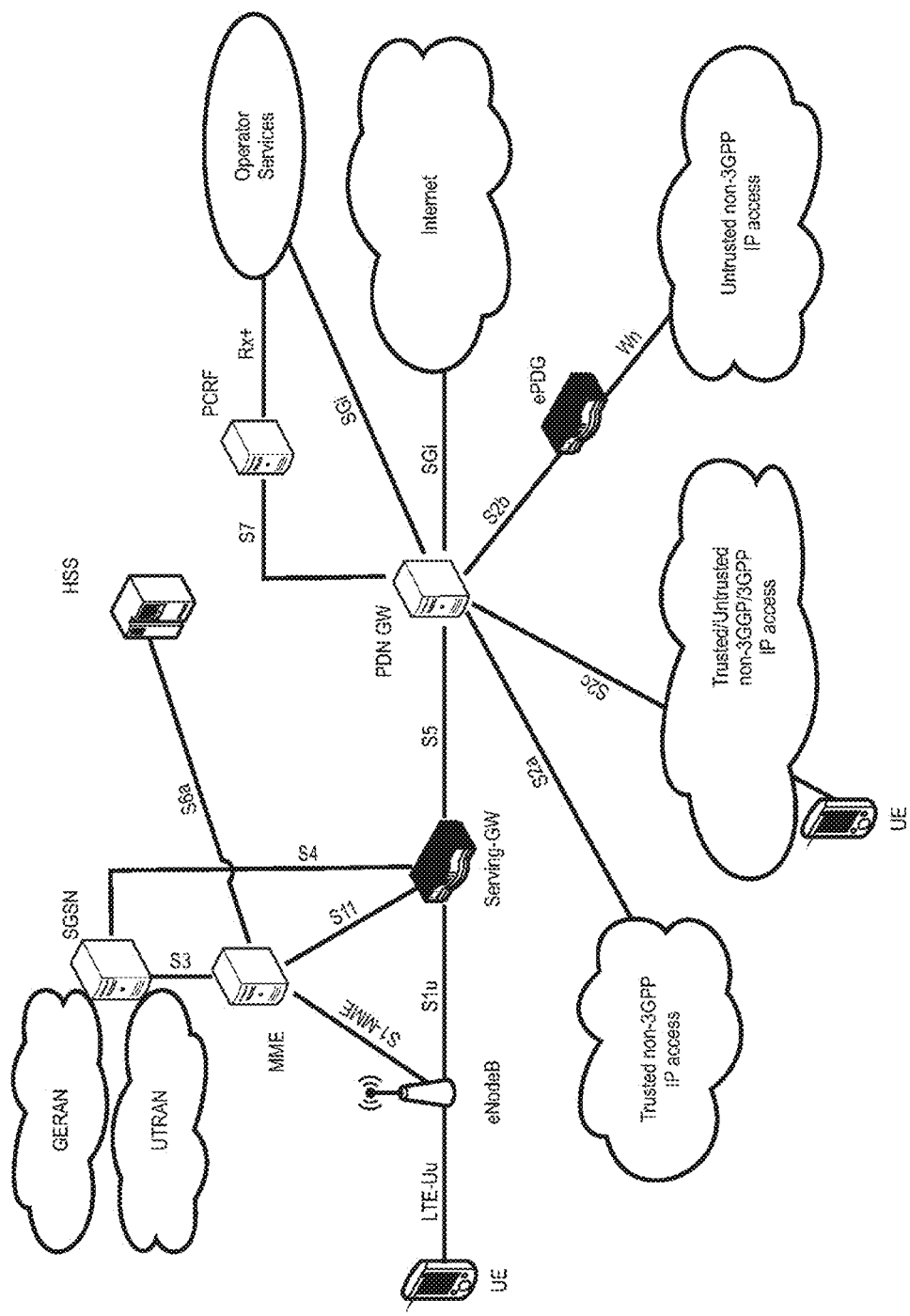
FIG. 1 shows an exemplary architecture of a 3GPP LTE system.
Figure 2:
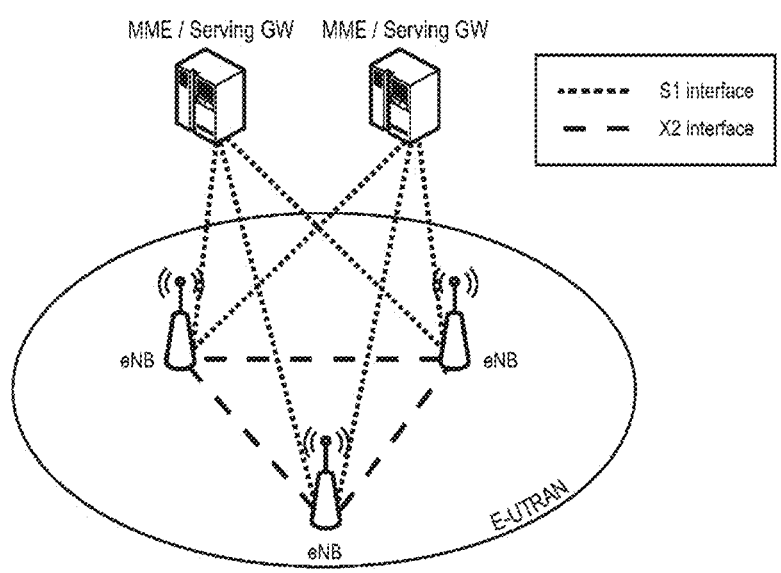
FIG. 2 shows an exemplary overview of the overall E-UTRAN architecture of 3GPP LTE.
Figure 3:
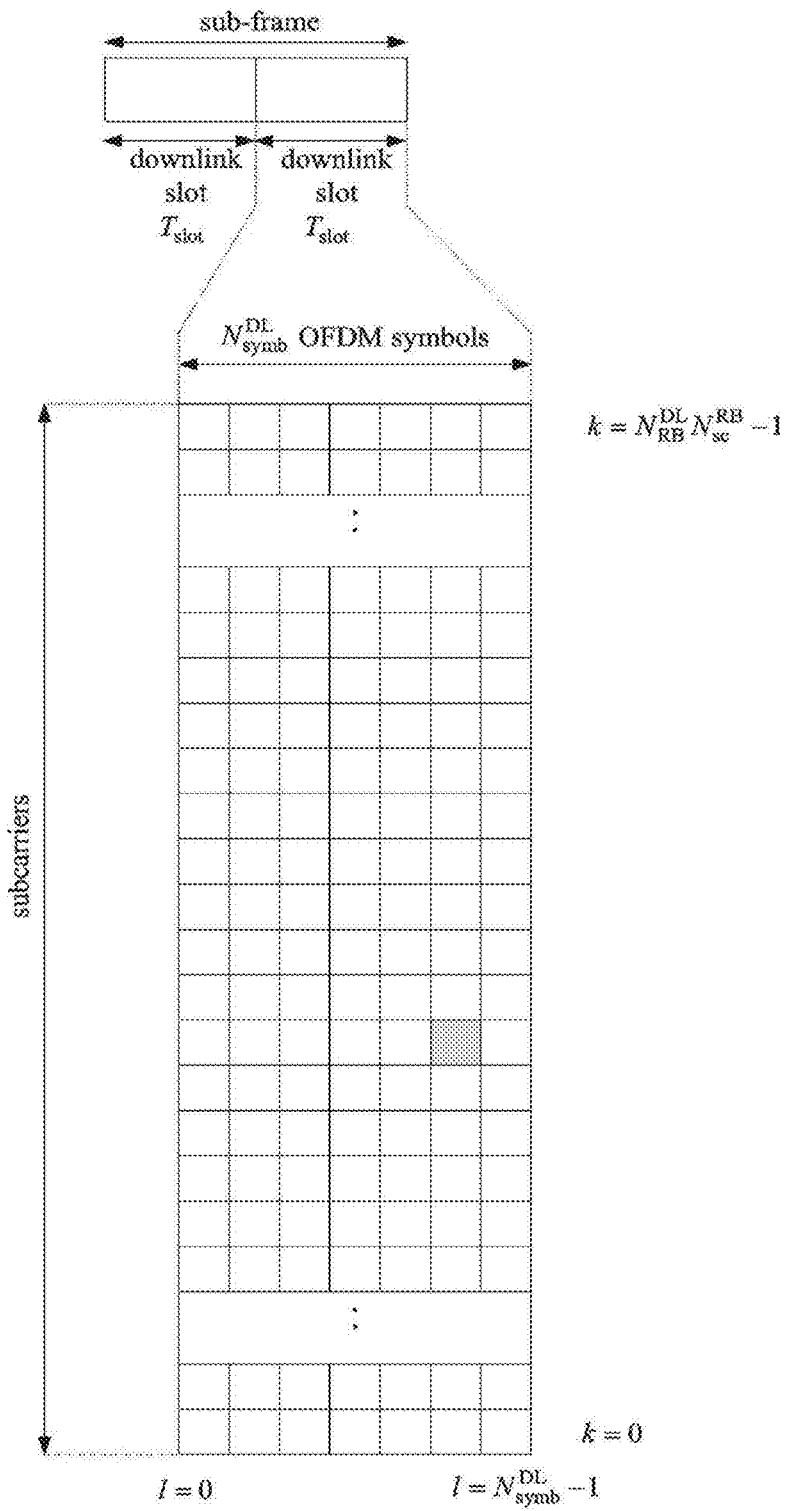
FIG. 3 shows exemplary sub-frame boundaries on a downlink component carrier as defined for 3GPP LTE (Release 8/9)
Figure 4:
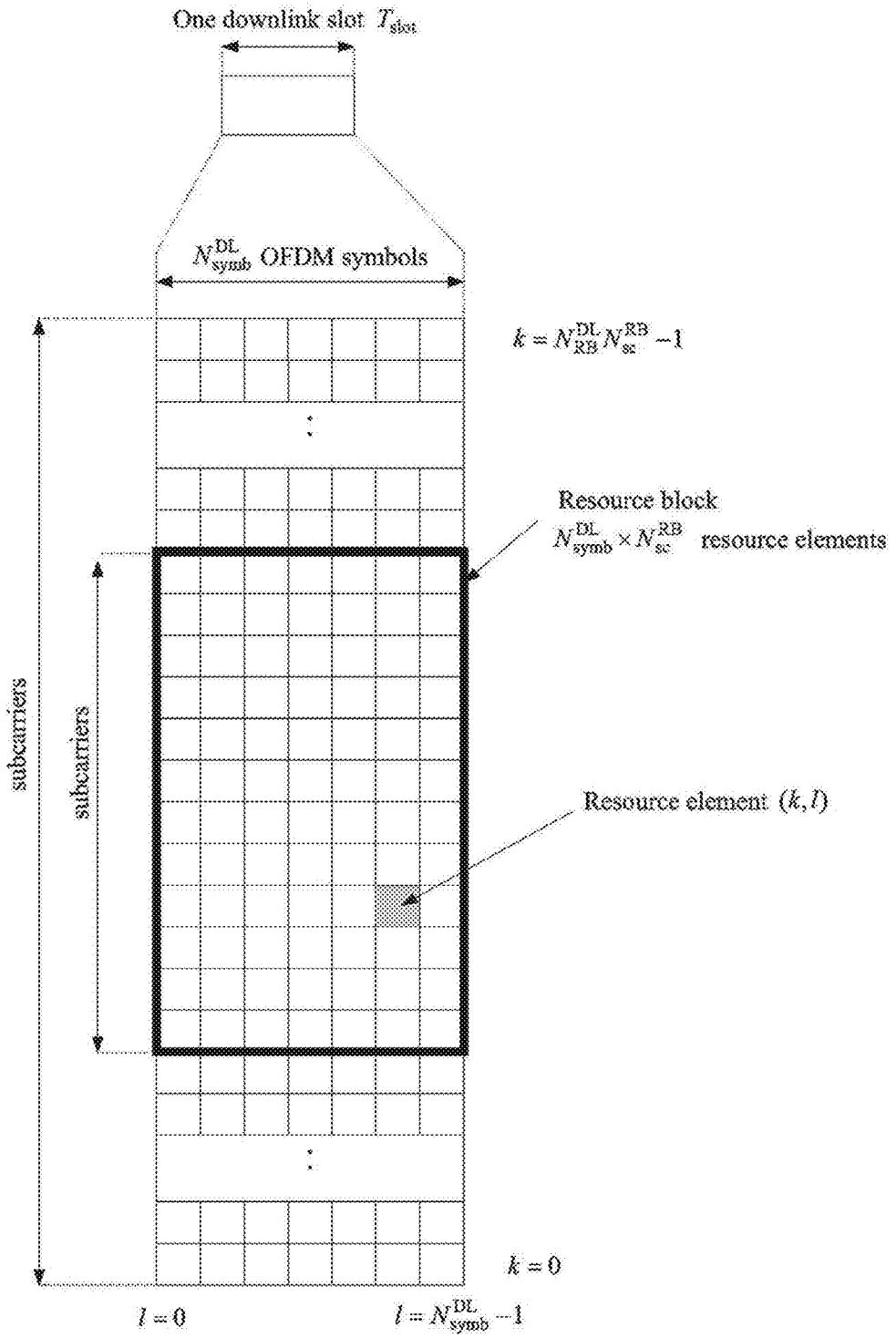
FIG. 4 shows an exemplary downlink resource grid of a downlink slot as defined for 3GPP LTE (Release 8/9)
Figure 5:
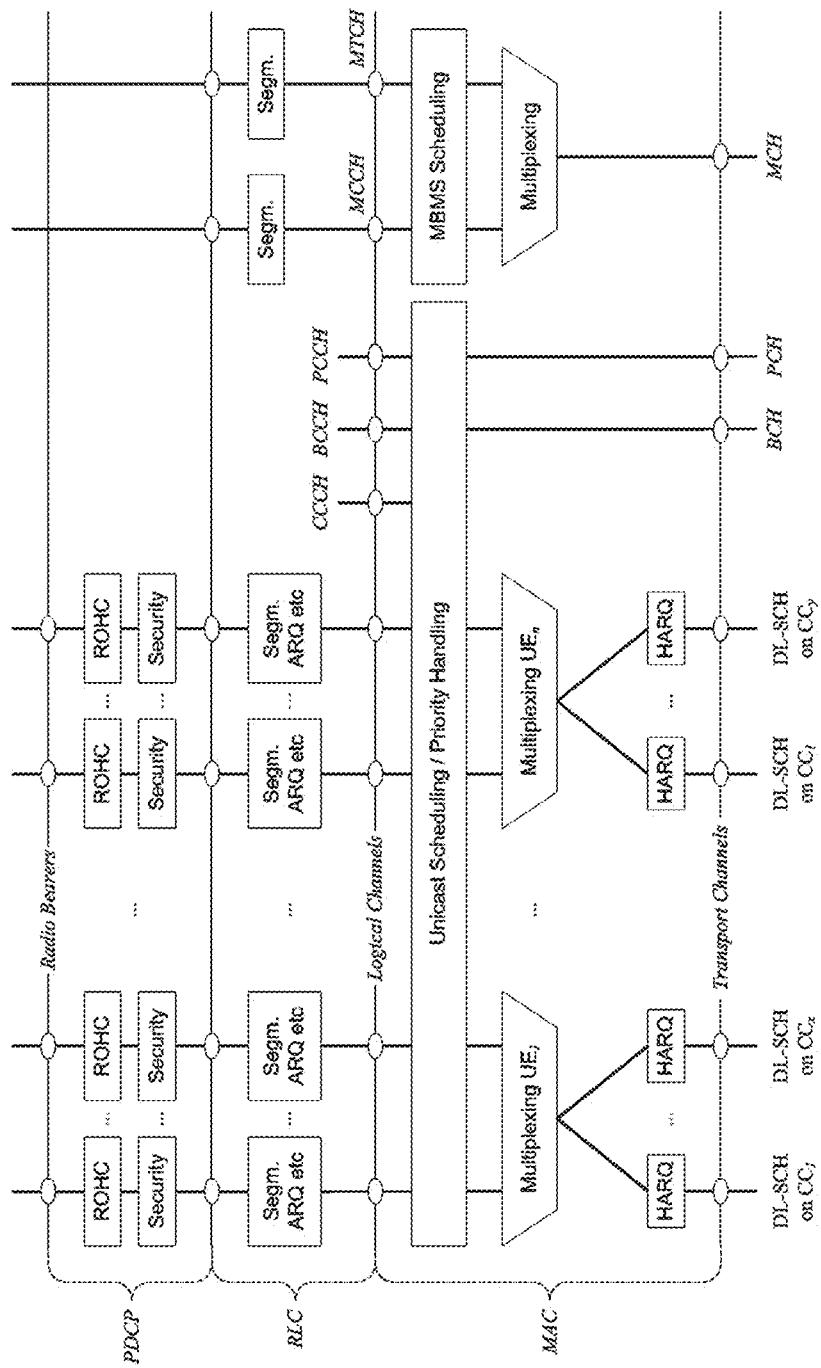
FIG. 5 shows the Layer 2 structure in 3GPP LTE (Release 10) with activated carrier aggregation for the downlink and uplink, respectively.
Figure 6:
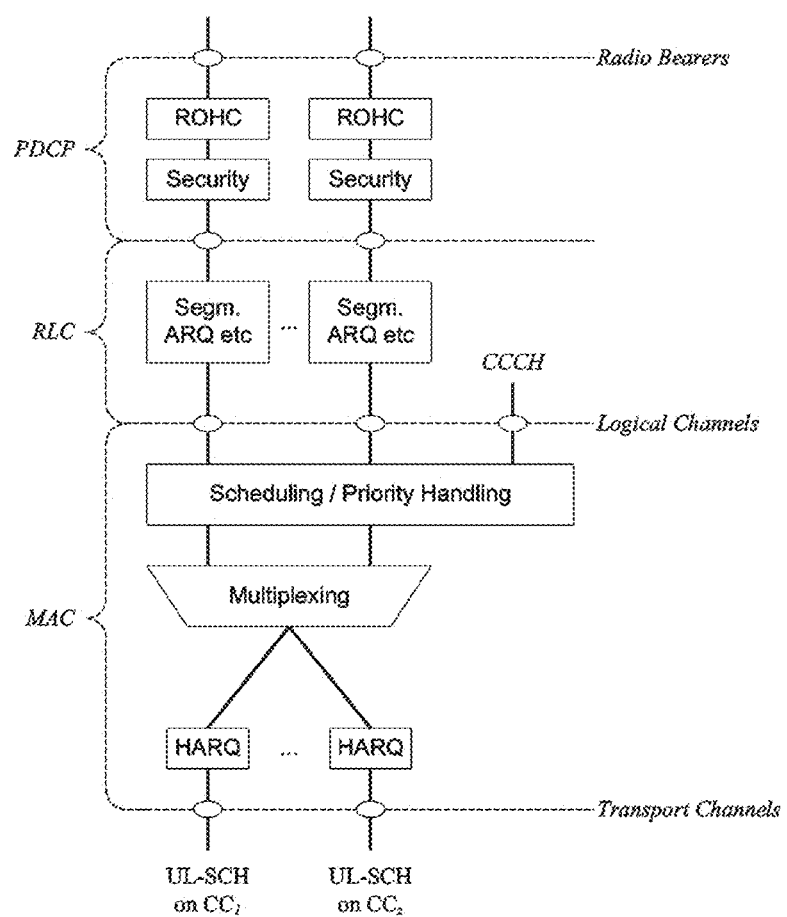
FIG. 6 shows the Layer 2 structure in 3GPP LTE (Release 10) with activated carrier aggregation for the downlink and uplink, respectively.

In the following, several embodiments will be explained in detail. For exemplary purposes only, most of the embodiments are outlined in relation to a radio access scheme according to 3GPP LTE (Release 8/9) and LTE-A (Release 10/11/12) mobile communication systems, partly discussed in the Technical Background section above.

It should be noted that the disclosure may be advantageously used for example in a mobile communication system such as 3GPP LTE-A (Release 12) communication systems as described in the BACKGROUND section above.

These embodiments are described as implementations for use in connection with and/or for enhancement of functionality specified in 3GPP LTE and/or LTE-A. In this respect, the terminology of 3GPP LTE and/or LTE-A is employed throughout the description. Further, exemplary configurations are explored to detail the full breadth of the disclosure.

The explanations should not be understood as limiting the disclosure, but as a mere example of the embodiments to better understand the disclosure. A skilled person should be aware that the general principles of the disclosure as laid out in the claims can be applied to different scenarios and in ways that are not explicitly described herein. Correspondingly, the following scenarios assumed for explanatory purposes of the various embodiments shall not limit the disclosure as such.

Exemplary embodiments will be described with reference to FIGS. 8-14. In particular, the exemplary embodiments relate to Physical Downlink Control Channel, PDCCH, assignments which are received by a mobile station to be configured with at least two among a plurality of serving cells included in a mobile communication system.

Exemplarily, the at least two among the plurality of serving cells may relate to unlicensed serving cells, among a plurality of licensed and unlicensed serving cells in a Licensed Assisted Access, LAA, deployment as discussed in the BACKGROUND section. Nevertheless, this mixed deployment scenario of LAA and LTE should not be understood as limiting the PDCCH assignments to licensed serving cells only.

Instead, the underlying concept relates to any uses of PDCCH assignments in a mobile communication system with a plurality of serving cells, thereby enhancing the allocation capabilities beyond the system restriction present with respect to PDCCH assignments.

Specifically, one restriction results from the addressing capabilities of different serving cells. For allocation of serving cells, the allocation mechanism presently only allows for the configuration of eight different serving cells to be indexed by the mobile station with in corresponding configuration messages. Specifically, the RRC reconfiguration message includes a serving cell index field, termed ServCellIndex in TS 36.213 or termed SCellIndex in TS 36.331, with 3 bits, hence, resulting in potentially eight indices for serving cells. Presently, only five out of the potentially available eight different cells can be indexed as serving cell indexes.

Another restriction results from the definition of a search space. As discussed with respect to the BACKGROUND section, for the definition of a search space as well as for the DCI formats to be transmitted therein, cf. specifically 3GPP TS 36.213 section 9.1.1 with the title "PDCCH assignment procedure" and 3GPP TS 36.212, section 5.3.3 "Downlink Control information", a carrier indicator field with 3 bits is introduced, hence, resulting in potentially eight values for carrier indicators. Presently, only five out of the potentially available eight different carriers can be used as carrier indicator field values.

Moreover, even though the above restrictions only refer to theoretical limits to the usage of PDCCH assignments, from there it already becomes apparent that there is a demand in mobile communication systems for a more flexible and better scalable mechanism which allows for utilization of PDCCH assignments with a high number of serving cells.

In the following, an example is discussed which proves the necessity for such a PDCCH assignment mechanism with respect to a mixed deployment of LAA and LTE scenario. Licensed carriers are contention-based carriers, such that a base station will compete with other, for example, WiFi nodes to utilize the channel. When more unlicensed carriers are available, the chance that base station occupies one unlicensed carrier is high.

Therefore, the base station's throughput increases with the increase of available unlicensed carriers to schedule. In other words, the higher the number of available unlicensed carriers to schedule, more unlicensed carriers should be configured. However, currently at maximum five carriers can be configured as explained below. The definition of a mechanism which allows for the configuration/activation/scheduling of more than five carriers is thus desirable.

The maximum number of serving cells cannot be increased beyond boundaries. For each serving cell, the search space of the serving cell is determined by a value $n_{CI}$. Further, a subsequently scheduled carrier is indicated by a Carrier ID, CID, value in the carrier indicator field, CIF, of PDCCH.

It is inherent to the present definition of PDCCH that the $n_{CI}$ value equals CIF, which equals a serving cell index. When the maximum number of serving cells increases to be larger than eight, serving cell index range needs to be extended, since currently three bits are used for serving cell index and serving cell index has the range of 0-7. As a result, $n_{CI}$ and CIF bits in PDCCH need to be extended.

When more than five serving cells are configured, the number of search spaces also increases to be more than five, since the number of search spaces is the same as the number of configured serving cells. With the increased number of search spaces, a higher number of blind decoding attempts in the search spaces are necessary, which imposes higher requirements on UE capability and increases the delay of PDCCH decoding.

In summary, it is advantageous to provide a PDCCH assignment mechanism which increases the number of configured serving cells, but reduces the number of blind decoding attempts, and further does not extend the carrier indicator field, CIF, in PDCCH.

Figure 8:
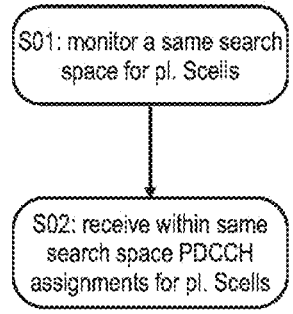
FIG. 8 exemplifies a reception of PDCCH assignments by a mobile station according to an embodiment.

Now, reference is made to an exemplary embodiment disclosed in combination with FIG. 8. Specifically, this embodiment is provided to establish the common concept underlying the subsequent embodiments which provide more implementation details and are described thereafter. In connection with this embodiment the reception of PDCCH assignments shall be discussed for which the following steps are to be performed by a mobile station.

In general, the following steps are to be performed in order to configure a mobile station with at least two serving cells among a plurality of serving cells included in a mobile communication system. The at least two serving cells may be unlicensed serving cells in the mixed deployment of LAA and LTE scenario including a plurality of licensed and unlicensed serving cells.

Firstly, for the reception of PDCCH assignments, the mobile station monitors (S01—FIG. 8) a same search space for the at least two serving cells to be configured. The same search space is defined as a same set of candidates for PDCCH assignments. Moreover, the term "monitoring of a set of candidates" implies that the mobile station attempts to decode each of the PDCCHs in the set of candidates according to all the monitored DCI formats.

The search space to be monitored by the mobile station is specific to the mobile station. This means that the search space is configured for the mobile stations individually. Hence, the search space to be monitored differs from a common search space which is monitored by all mobile stations in the radio cell of the mobile communication system.

In a first example, the at least two serving cells have different serving cell indices. Despite the different serving cell indices, a same search space shall be monitored by the mobile station. To the end, the search space is determined by the mobile station independently of the indices of the at least two serving cells with which the mobile station is to be configured. Hence, this first example does not adopt the established principle that the search space is defined for a serving cell in accordance with the index of the serving cell.

Rather, it has been recognized in connection with this first example that a search space can be defined independently of the index of a serving cell with which the mobile station is to be configured to achieve the advantageous PDCCH assignment mechanism. Consequently, in the first example the number of available serving cell indices is not restricted by the number of search spaces which can be monitored by a mobile station.

In a second different, alternative example, the at least two serving cells may have a same serving cell index. In this respect, a (same) search space to be monitored by the mobile station is determined based on the serving cell index. In other words, the same search space is determined by the mobile station according to the same index of the at least two serving cells with which the mobile station is to be configured.

Hence, this second example adopts the established principle that the search space is defined for a serving cell in accordance with the index of the serving cell. Nevertheless, having at least two serving cells with a same serving cell index necessitates a different utilization of the same (i.e. single) search space for PDCCH assignments which is described with respect to the following.

For the reception of PDCCH assignments, the mobile station monitors and attempts to decode (S02—FIG. 8) PDCCH assignments for the at least two serving cells within the same search space. In other words, the mobile station receives the at least two serving cells PDCCH assignments from among the monitored same set of candidates. When receiving PDCCH assignments, the mobile station shall additionally identify to which of the at least two serving cells the PDCCH assignment relates since the mobile station uses a same search space for the two serving cells. For instance, as the mobile station uses a same search space for configuration with at least two serving cells, the mobile station has to rely on an identification of the serving cell to which the PDCCH assignment relates.

Accordingly, it is no longer sufficient for the mobile station to 'know' the search space on which PDCCH assignment is received to conclude on a serving cell to which the received PDCCH assignment relates. Instead, since the same search space is used for the configuration of the at least two serving cells, the step of receiving PDCCH assignments within the same search space includes identifying the serving cell for which the PDCCH assignment is intended.

Referring back to the first example, even though a same search space is monitored, the at least two serving cells have different cell indices. Hence, the mobile station can distinguish between serving cells in the same search space by way of the serving cell index. In other words, irrespective of whether PDCCH assignments are received within a same search space, the mobile station can identify the serving cell for which the PDCCH assignments are received.

Specifically, in the first example, the received PDCCH assignments include carrier indicator field, CIF, values which correspond to the respective indices of the at least two serving cells with which the mobile station is to be configured. Hence, the CIF values in the received in the PDCCH assignments allow identifying the at least two serving cells with which the mobile station is to be configured.

Advantageously, in the first example the mechanism allows for an increased number of configured serving cells, as the inherent restriction resulting from the maximum five search spaces is no longer limiting the number of serving cells that can be indexed. In other words, as the search space is defined independently of the serving cell indices, the mobile station can be configured with a maximum of eight serving cells. At the same time the number of blind decoding attempts does not increase and the size of carrier indicator field, CIF, in the PDCCH does not have to increase.

With regard to the second example, the at least two serving cells, for which the same search space is monitored by the mobile station, have a same serving cell index. Despite the same serving cell index, the mobile station receives PDCCH assignments for the at least two serving cells with which the mobile station is to be configured.

Specifically, in the second example, the received PDCCH assignments include a carrier indicator field, CIF, value which corresponds to the respective indices of the at least two serving cells with which the mobile station is to be configured. Accordingly, the carrier indicator field, CIF, value in the received PDCCH assignments does not allow for the identification of the two serving cells. Hence, the second example does not adopt the established principle that serving cells are identified by a CIF value included in the PDCCH assignment.

Rather, it has been recognized in connection with this second example that the PDCCH assignment is received for the at least two serving cells irrespective and, hence, independently of the included CIF value, as this value does not allow distinguishing between the at least two serving cells with which the mobile station is to be configured to achieve the advantageous PDCCH assignment mechanism. Consequently, in the second example the number of serving cells for which the mobile station receives PDCCH assignments is not restricted by the number of search spaces which can be monitored by a mobile station and which limits the indices of serving cells.

Advantageously, also in the second example the mechanism allows for an increased number of configured serving cells, as the inherent restriction resulting from the maximum five search spaces is no longer limiting the identification of serving cells for which PDCCH assignments are received. In other words, as the search space is defined independently of receipt of PDCCH assignments, the mobile station can be configured with more than five serving cells. At the same time, the number of blind decoding attempts does not increase, and the size of the carrier indicator field, CIF, in the PDCCH assignments does not have to increase.

Figure 9:
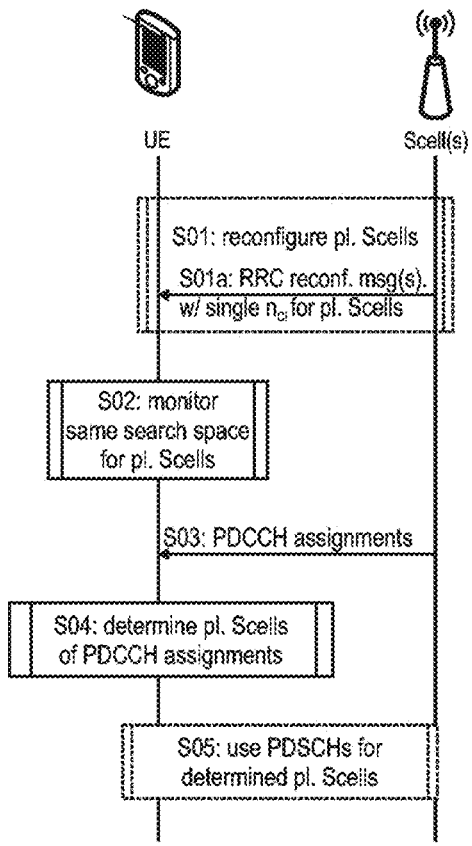
FIG. 9 illustrates an exemplary sequence diagram of the reception of PDCCH assignments by a mobile station according to another embodiment.

Now, reference is made to a more detailed embodiment disclosed in combination with FIG. 9. Specifically, this embodiment exemplifies implementation aspects of the PDCCH assignment mechanism of the general concept disclosed in connection with the previous exemplary embodiment(s).

Figure 7A:
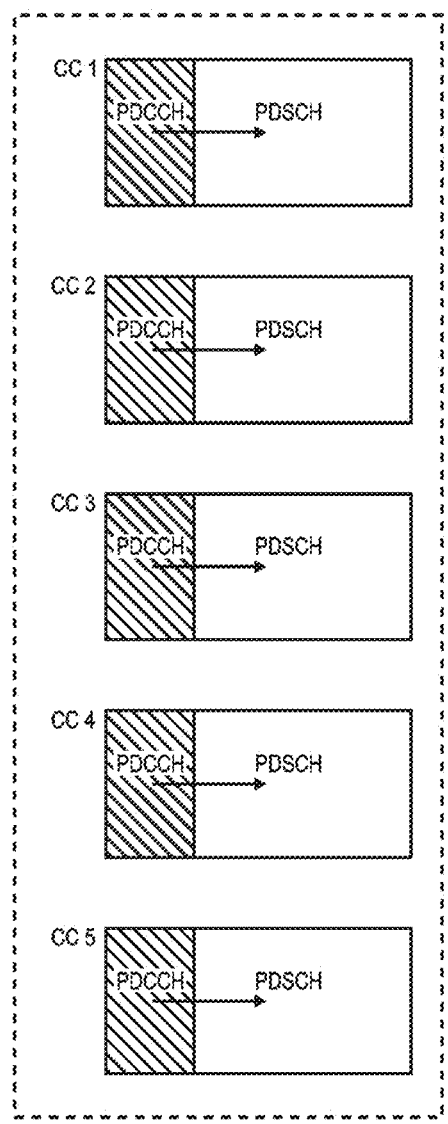
FIG. 7A details the PDCCH scheduling procedure in 3GPP LTE (Release 10)
Figure 7B:
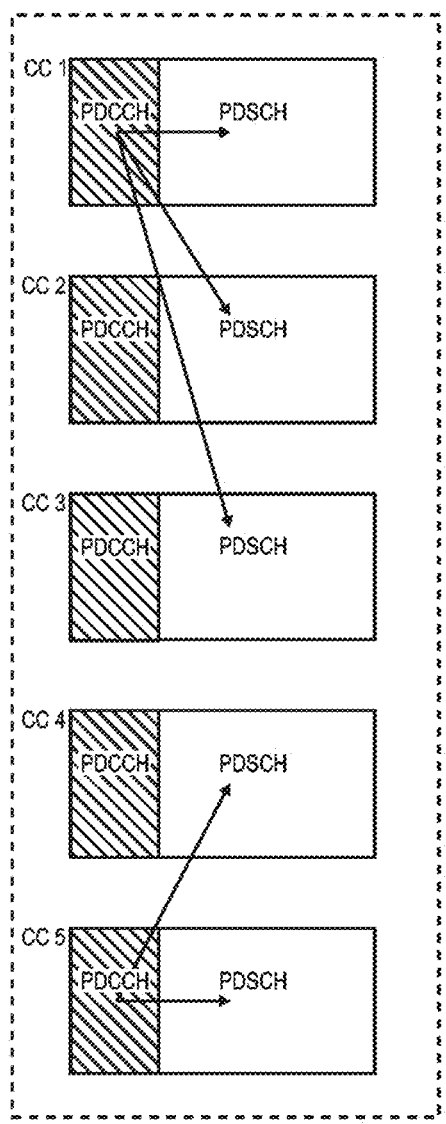
FIG. 7B details the PDCCH cross carrier scheduling procedure in 3GPP LTE (Release 10)

This embodiment refers to the concept of cross-carrier scheduling, as illustrated in FIG. 7B. In particular, cross-carrier scheduling is configured by, for example, RRC signaling. Generally, among the serving cells that share the same search space, either all of them are configured with cross-carrier scheduling on another cell not sharing the same search space or all of them are scheduled on one of the serving cells that share the same search space.

In this embodiment, the mobile station receives (S01a—FIG. 9) at least one RRC reconfiguration message (abbreviation for RRC connection reconfiguration message) to configure the mobile station with the at least two serving cells among the plurality of serving cells. Accordingly, the configuration of the mobile station with the at least two serving cells is triggered by the receipt of the at least one RRC reconfiguration message.

Exemplarily, the mobile station receives one RRC reconfiguration message including a reference to, and hence a trigger for the configuration of the at least two serving cells. Alternatively, the mobile station receives at least two RRC reconfiguration messages which separately include a reference to, and, hence a trigger for, the (e.g. joint) configuration of the at least two serving cells.

Accordingly, the PDCCH assignment mechanism of this embodiment is initiated within the RRC layer. Notably, only the RRC reconfiguration message is described in this embodiment as the further communication of the RRC reconfiguration procedure which is triggered thereby is not of importance for the reception of PDCCH assignments.

In other words, this omission of, for example, the RRC reconfiguration complete message (abbreviation for RRC connection reconfiguration complete message) shall not be construed as limiting the present disclosure; moreover, this message is also transmitted in the present embodiment upon successful completion (S01—FIG. 9) in the similar manner as the commonly-known RRC reconfiguration procedure.

After the configuration, the mobile station monitors (S02—FIG. 9) a same search space for the at least two serving cells with which the mobile station is to be configured. Further, the mobile station receives (S03—FIG. 9) PDCCH assignments for the at least two serving cells and identifies, i.e. determines (S04—FIG. 9) that particular serving cell for which the received PDCCH assignments is intended.

For brevity, the detailed description of the three steps (S02, S03, and S04—FIG. 9) is omitted and reference is made only to the previous description of the steps (S01 and S02 of FIG. 8) of the general concept to be performed by the mobile station.

Nevertheless, it shall be emphasized that these three steps of the PDCCH assignment mechanism are performed as part of Layer 1. Accordingly, the PDCCH assignments may be received from one and only one serving cell which can be the primary or a secondary cell of the mobile terminal, and which however can be different from the at least two serving cells for which the mobile station is to be configured.

In an exemplary implementation, the mobile station receives (S03—FIG. 9) the PDCCH assignments according to one of the DCI formats. Hence, the configuration of the at least two serving cells allows, upon successful reception of the PDCCH assignment, the scheduling of PUSCH or PDSCH transmissions (S05—FIG. 9) on the at least two serving cells.

First Exemplary Implementation

Figure 10:
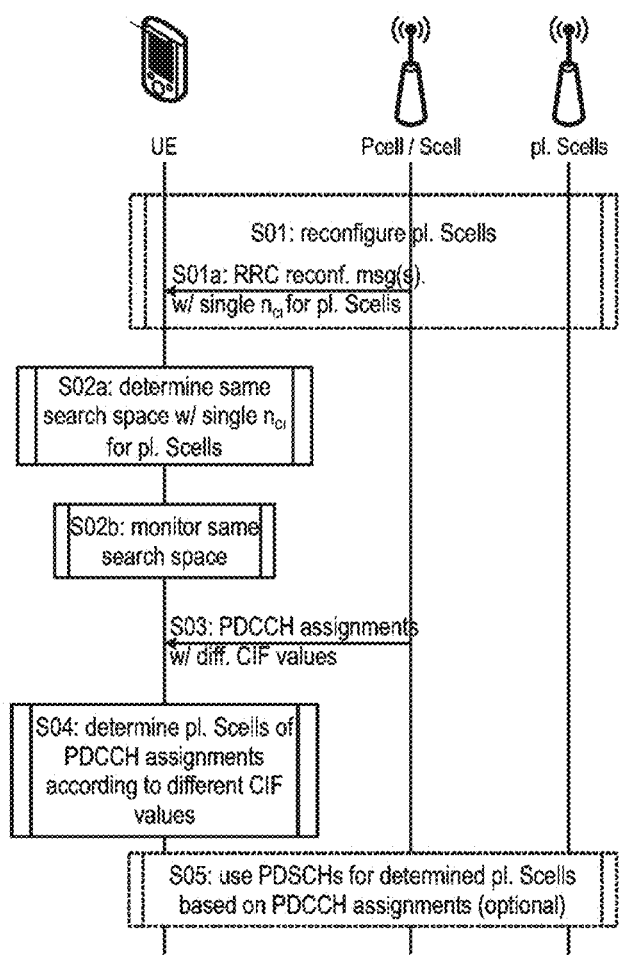
FIG. 10 shows an exemplary sequence diagram of the reception of PDCCH assignments by a mobile station according to a first exemplary implementation of a further embodiment.

Now, reference is made to an embodiment providing a first exemplary implementation of the PDCCH assignment procedure disclosed with reference to FIG. 10. Specifically, this embodiment provides details on an implementation of the first example to the initial exemplary embodiment described before. For brevity, the repeated description has been omitted and reference shall be made only to the previous embodiments using same terms and reference signs.

In this embodiment, the mobile station receives (S01a—FIG. 10) at least one RRC reconfiguration message for configuring the UE with the at least two serving cells among the plurality of serving cells. The at least one RRC reconfiguration message includes a same $n_{CI}$ value for independently determining the same search space for the at least two serving cells. Specifically, the at least one RRC reconfiguration message received by the UE station includes, for each of the at least two serving cells, different serving cell indices, but the same $n_{CI}$ value, such that the $n_{CI}$ value, used for determining the (same) search space for the at least two serving cells, is independent of the serving cell indices of the at least two serving cells with which the UE is to be configured.

Subsequently, the UE determines (S02a—FIG. 10) the same search space using the received same $n_{CI}$ value included in the RRC reconfiguration message, and subsequently can monitor the determined (S02b—FIG. 10) same search space for the at least two serving cells.

The same search space $S^{(L)}_k$ is determined by the mobile station for the at least two serving cells using the same $n_{CI}$ value, applying the formula:

$$S_k^{(L)} = L\{(Y_k+m') \bmod \lfloor N_{CCE,k}/L \rfloor\} + i$$

wherein an aggregation level L is defined as $L \in \{1, 2, 4, 8\}$, wherein $i=0, \ldots, L-1$, wherein $Y_k$ is defined as $Y_k=(A \cdot Y_{k-1}) \bmod D$, wherein for the search space specific to the mobile station $m'=m+M^{(L)} \cdot n_{CI}$, where $n_{CI}$ is included in the received RRC reconfiguration message, and wherein $M^{(L)}$ is the number of the set of candidates of PDCCH assignments to monitor in the given search space, wherein $N_{CEE,k}$ is the total number of CCEs in the control region of subframe k, and wherein $Y_{-1}=n_{RNTI} \neq 0$, $A=39827$, $D=65537$, $k=\lfloor n_s/2 \rfloor$, and $n_s$ is the slot number within a radio frame.

Further, the mobile station receives (S03—FIG. 10) PDCCH assignments for the at least two serving cells and then determines or identifies (S04—FIG. 10) that target serving cell for which the PDCCH assignments is intended. To the end, the received PDCCH assignments include different carrier indicator field, CIF, values which correspond to the respective indices of the at least two serving cells with which the mobile station is to be configured. Hence, the different CIF values in the received in the PDCCH assignments allow identifying the respective target serving cells for which the PDCCH assignment is intended.

Advantageously, in this embodiment the mechanism allows for an increased number of configured serving cells, as the inherent restriction resulting from the maximum five search spaces is no longer limiting the number of serving cells that can be indexed. In other words, as the search space is defined independently of the serving cell indices, the mobile station can be configured with up to eight serving cells. At the same time, the number of blind decoding attempts does not increase and the size of the carrier indicator field, CIF, in PDCCH does not need to be increased.

Variants of the First Exemplary Implementation

Another variant of the first exemplary implementation will be explained in the following, in which the mobile station receives at least one RRC reconfiguration message to configure the mobile station with the at least two serving cells among the plurality of serving cells. The at least one RRC reconfiguration message includes a same $n_{SS}$ value for independently determining the same search space for the at least two serving cells. In particular, the at least one RRC reconfiguration message received by the mobile station includes, for each of the at least two serving cells, different serving cell indices, but the same $n_{SS}$ value such that the $n_{SS}$ value, used for determining the (same) search space for the at least two serving cells, is independent of the indices of the at least two serving cells with which the mobile station is to be configured.

Consequently, the mobile station determines the same search space using the same $n_{SS}$ value received in the RRC reconfiguration message and monitors the determined same search space for the at least two serving cells. The same search space $S^{(L)}_k$ is determined by the mobile station for the at least two serving cells using the same $n_{SS}$ value, applying the formula:

$$S_k^{(L)} = L\{(Y_k+m') \bmod \lfloor N_{CCE,k}/L \rfloor\} + i$$

wherein an aggregation level L is defined as $L \in \{1, 2, 4, 8\}$, wherein $i=0, \ldots, L-1$, wherein $Y_k$ is defined as $Y_k=(A \cdot Y_{k-1}) \bmod D$, wherein for the search space specific to the mobile station $m'=m+M^{(L)} \cdot n_{SS}$, where $n_{SS}$ is included in the received RRC reconfiguration message, and wherein $M^{(L)}$ is the number of the set of candidates of PDCCH assignments to monitor in the given search space, wherein $N_{CEE,k}$ is the total number of CCEs in the control region of subframe k, and wherein $Y_{-1}=n_{RNTI} \neq 0$, $A=39827$, $D=65537$, $k=\lfloor n_s/2 \rfloor$, and $n_s$ is the slot number within a radio frame.

Subsequently, the UE receives PDCCH assignments for the at least two serving cells and additionally identifies, i.e., determines, that serving cell for which the PDCCH assignment(s) is received.

Figure 11:
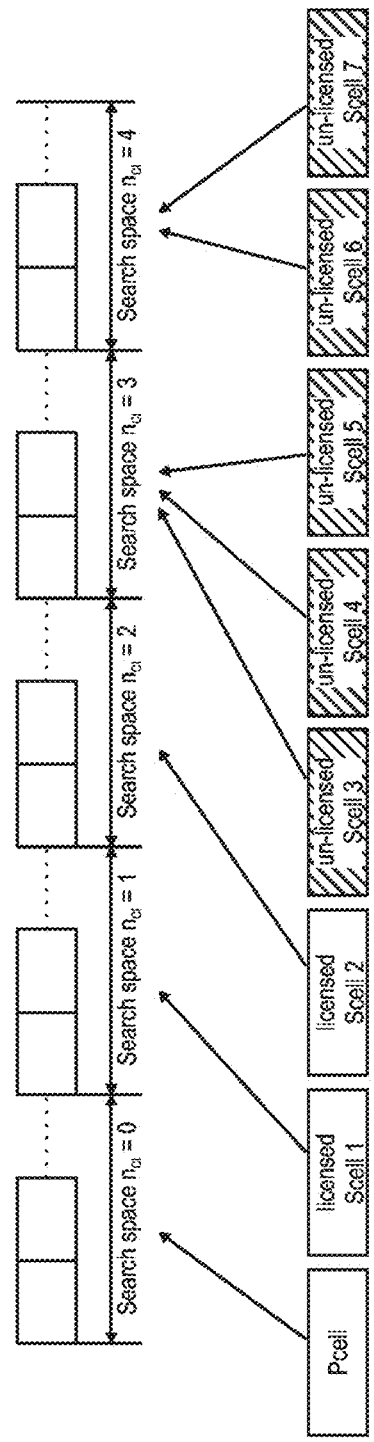
FIG. 11 illustrates an example of the first exemplary implementation of the PDCCH assignment mechanism when applied to a mixed deployment of LAA and LTE scenario.
Figure 12:
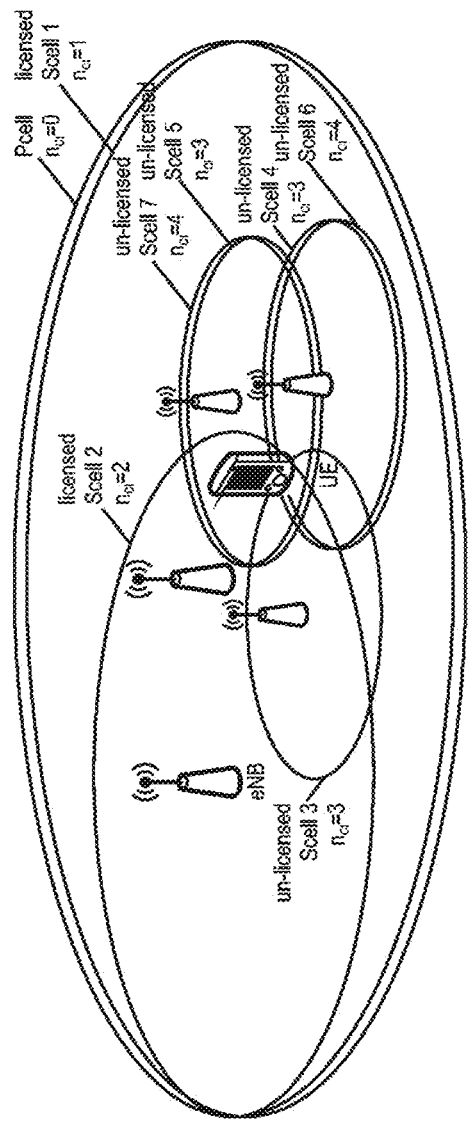
FIG. 12 illustrates an example of the first exemplary implementation of the PDCCH assignment mechanism when applied to a mixed deployment of LAA and LTE scenario.

Now, reference is made to FIGS. 11 and 12 illustrating an example of the first exemplary implementation of the PDCCH assignment mechanism when applied to an LAA deployment scenario. Specifically, the UE shown in FIG. 12 utilizes five different search spaces defined by $n_{CI}$ values 0-4 and has eight different serving cells.

Specifically, a (licensed) primary cell (PCell) and licensed secondary cells 1 and 2 are scheduled via search spaces defined by $n_{CI}$ values 0-2, respectively. Unlicensed secondary cells 3, 4, and 5 are scheduled via the same search space defined by $n_{CI}$-value 3. Further, unlicensed secondary cells 6, and 7 are scheduled via the same search space defined by $n_{CI}$-value 4.

Accordingly, as the search spaces are defined independently of the serving cell indices, the mobile station can be configured with a maximum of eight serving cells. To support more than eight serving cells without increasing carrier indicator field, CIF, within the PDCCH assignments, cross carrier scheduling can be configured on multiple serving cells. For example, a PDCCH is configured to be scheduled on 3 carriers. Each carrier is configured to cross schedule seven carriers (including the scheduling carrier is 8 carriers). Five search spaces are configured for the eight carriers. On each scheduling carrier, CIF can be used to indicate the carrier index of the target carrier. Therefore, in total, 3*8=24 carriers can be supported with 3*5=15 search spaces.

Second Exemplary Implementation

Now, reference is made to an embodiment providing a second exemplary implementation of the PDCCH assignment procedure described with reference to FIG. 13. Specifically, this embodiment provides details on an implementation of the second example to the initial exemplary embodiment described before. For brevity, the repeated description has been omitted and reference shall be made only to the previous embodiments using same terms and reference signs.

In this embodiment, the mobile station receives (S01a—FIG. 13) at least one RRC reconfiguration message for configuring the mobile station with at least two serving cells among the plurality of serving cells. The at least one RRC reconfiguration message includes a same (i.e. single) index of the at least two serving cells with which the mobile station is to be configured. Based on this same serving cell index, a same search space is to be determined by the mobile station for monitoring for PDCCH assignments. In other words, the same search space is determined by the mobile station according to the same index of the at least two serving cells included in the RRC reconfiguration message.

Advantageously, the above-described RRC reconfiguration message may also include additional information enabling the mobile station to distinguish between the at least two serving cells with which the mobile station is to be configured. As the at least two serving cells have a same serving cell index, the index does no longer (i.e. in contrast to the related art) enable the mobile station upon reception of the RRC reconfiguration message to distinguish between the two serving cells within the RRC reconfiguration procedure.

Nevertheless, it shall however be emphasized that the inclusion of additional information for the distinction between the at least two serving cells is not strictly necessary, since the same information can also be obtained as part of the subsequent step of determining, i.e., identifying the at least two serving cells for which the PDCCH assignments are received. Moreover, the inclusion of additional information in the RRC reconfiguration message dispenses with the need for further signaling between Layer 1 and RRC layer, hence, reducing the implementation complexity.

Subsequently, the mobile station determines (S02a—FIG. 13) the same search space using the same serving cell index included in the RRC reconfiguration message and subsequently can monitor the determined (S02b—FIG. 13) same search space for the at least two serving cells.

In more detail, the mobile station determines the same search space $S^{(L)}_k$ for the at least two serving cells using the same serving cell index as the $n_{CI}$ value, applying the formula:

$$S_k^{(L)}=L\{(Y_k+m')\mathrm{mod}\ \lfloor N_{CCE,k}/L\rfloor\}+i$$

wherein an aggregation level L is defined as $L \in \{1, 2, 4, 8\}$, wherein $i=0, \ldots, L-1$, wherein $Y_k$ is defined as $Y_k=(A \cdot Y_{k-1})\mathrm{mod}\ D$, wherein for the search space specific to the mobile station $m'=m+M^{(L)} \cdot n_{CI}$, where $n_{CI}$ is the same serving cell index, and wherein $M^{(L)}$ is the number of the set of candidates of PDCCH assignments to monitor in the given search space, wherein $N_{CCE,k}$ is the total number of CCEs in the control region of subframe k, and wherein $Y_{-1}=n_{RNTI}\neq 0$, $A=39827$, $D=65537$, $k=\lfloor n_s/2 \rfloor$, and $n_s$ is the slot number within a radio frame.

Subsequently, the mobile station receives (S03—FIG. 13) PDCCH assignments for the at least two serving cells and then determines or identifies (S04—FIG. 13) the target serving cell for which the PDCCH assignments have been received. The received PDCCH assignments however include the same carrier indicator field, CIF, value which corresponds to the respective (i.e. same) indices of the at least two serving cells with which the mobile station is to be configured. Thus, the carrier indicator field, CIF, value in the received PDCCH assignments does not allow for identifying of the target serving cell for the PDCCH assignments.

According to a first variant, the PDCCH assignments received by the mobile station includes a Resource Block Assignment, RBA, field, (within at least DCI formats 0, 1, 1A, 1B, 1C, 1D, 2, 2A, 2B, 2C, 2D, and 4; see also BACKGROUND section) and the RBA field may be used to include information for identifying the target serving cell(s). Exemplarily, information for identifying the at least two serving cells is included in the RBA field in each of the received PDCCH assignments and is combined with the allocation information while maintaining the same number of bits. In more detail, according to an exemplary implementation, the mobile communication system can be configured, and specifically the RBG size can be configured, such that the RBA field provides a 'spare' number of five bits for "multiplexing" additional information to allow identification of the target serving cell(s). For the RBA field in the DCI messages, it is possible to increase the RBG size for allocation type 0 (cf. with BACKGROUND section). Currently, for 20 MHz bandwidth, there are 100 RBs, and the RBG size is 4PRBs.

Further, according to TS 36.212, section 5.3.3.1.2, 100/4=25 bits are used for RBA field. If the RBG size is increased to 5 PRBs, 100/5=20 bits are only needed for RBA field, 5 bits are thus left, which can then be used for unlicensed carrier index indication. In case of unlicensed carrier, a larger block size can be used for unlicensed carrier to increase throughput. Otherwise, licensed carriers can be used.

According to another variant, the PDCCH assignments received by the mobile station are in a dedicated format of a DCI message including a separate field for identifying the target serving cell for which the PDCCH assignment is actually intended. In this respect, it is possible to define dedicated formats as variants of the existing DCI formats additionally including a dedicated field for identifying the target serving cell.

Moreover, the dedicated DCI format(s) may be defined to include the separate field for identifying the target serving cell(s) at the expense of other information normally included in the existing DCI formats so as to maintain the overall size of the dedicated DCI format. Alternatively, the dedicated DCI format(s) may be defined to include the separate field for identifying the at least two serving cells in addition to the information normally included in the existing DCI formats thereby resulting in an increased size of the dedicated (e.g. new) DCI format.

Further, as discussed before the received PDCCH assignments additionally include information for identifying the at least two serving cells with which the mobile station is to be configured. Hence, the additional information in the received in the PDCCH assignments allows identifying the at least two serving cells with which the mobile station is to be configured. Consequently, the number of serving cells for which the mobile station receives PDCCH assignment is not restricted by the number of search spaces which can be monitored with in a mobile station and limiting the indices of serving cells.

Advantageously, the above described PDCCH assignments allows for an increased number of configured serving cells, as the inherent restriction resulting from the maximum five search spaces is no longer limiting the identification of serving cells for which PDCCH assignments are received. In other words, as the search space is defined independently of receipt of PDCCH assignments, the mobile station can be configured with more than five serving cells. At the same time the number of blind decoding attempts does not increase and the carrier indicator field, CIF, in PDCCH does not increase.

Now, reference is made to FIG. 14 illustrating an example of the second exemplary implementation of the PDCCH assignment mechanism when applied to a mixed deployment of LAA and LTE scenario. Specifically, the mobile station shown utilizes five different search spaces defined by $n_{CI}$ values 0, 2, 3, 5, and 6 and schedules at least six different serving cells included in a mobile communication system.

Specifically, a (licensed) primary cell and a licensed secondary cell 1 are scheduled via search spaces defined by $n_{CI}$ values 0 and 2, respectively. At least two unlicensed secondary cells 3 are jointly scheduled via the search space defined by $n_{CI}$ value 3. Further, a licensed secondary cell 5 and a licensed secondary cell 6 are jointly scheduled via the search spaces defined by $n_{CI}$ values 5 and 6, respectively.

Accordingly, as the search space is defined independently of additional information for identifying the serving cell indices, the mobile station can be configured with more than five serving cells.

Third Exemplary Implementation

A further embodiment relates to a third exemplary implementation of the PDCCH assignment procedure which shall be discussed in the following. Specifically, this embodiment explores the idea that the CIF values included in the PDCCH assignments can be reused for the scheduling of a mobile station between different search spaces as long as the search space in combination with the CIF values allows for an unambiguous identification of the serving cells with which the mobile station is to be configured.

In this respect, it has been recognized that for serving cells the search spaces to be monitored by the mobile station (also search spaces specific to a mobile station) may have overlap between each other, such that the mobile station monitoring the two overlapping search spaces cannot distinguish whether a PDCCH assignment detected in the overlapping search space area was received within one or within the other of two overlapping search spaces.

However, the overlap between search spaces is not always present such that a search space may also be determined by a mobile station such that search spaces have no overlap with the remaining search spaces of a plurality of serving cells. For such a non-overlapping search space, the CIF values included in PDCCH assignments can be reused without impact on the unambiguous identification of the serving cells with which the mobile station is to be configured.

Moreover, since the mobile station 'knows' for which serving cells it monitors the same search space, and the PDCCH assignments received by the mobile station include a CIF value which is unambiguous within the same search space, same suffices in identifying that serving cells for which the PDCCH assignments are received.

Consequently, also the PDCCH assignment mechanism of this embodiment allows for the advantage of increasing the number of configured serving cells, while at the same time reducing the number of blind decoding attempts, and does not need to extend the size of the carrier indicator field, CIF, in PDCCH assignments.

In more detail, in the embodiment the at least two serving cells with which the mobile station is to be configured have a same serving cell index. The indices of the at least two serving cells, with which the mobile station is to be configured, are however independent of the CIF values, included in the PDCCH assignments.

In this context, the mobile station monitors, for the at least two serving cells, a same set of candidates for PDCCH assignments defining a same search space. The same search space is specific to the mobile station.

The same search space is determined according to the same index of the at least two serving cells with which the mobile station is to be configured such that the search space has no overlap with search spaces for the remaining of the plurality of serving cells.

Further, the mobile station receives, for the at least two serving cells, PDCCH assignments from among the monitored same set of candidates using carrier indicator filed, CIF, values included in the received PDCCH assignments.

As long as the CIF values are unambiguously used at least for the non-overlapping search space, the CIF values included in the PDCCH assignment allow for the mobile station to identify the target two serving cell for which the PDCCH assignment is received.

In an exemplary variation of this embodiment, the mobile station receives at least one RRC reconfiguration message, according to which the mobile station is configured with the at least two serving cells among the plurality of serving cells.

In an exemplary variation, the defined same, non-overlapping search space for the at least two serving cells is determined to be separate from search spaces for different serving cells among the plurality of serving cells.

In a further exemplary variation, the set of candidates for PDCCH assignments defining the same, non-overlapping, search space is configured as a E-PDCCH search space, and the set of candidates for PDCCH assignments defining search spaces for different serving cells are configured as a PDCCH search space.

Specifically, the mixed deployment scenario of LAA and LTE may be utilized for the PDCCH assignment mechanism of this embodiment in that the same search space for unlicensed serving cells is configured separately from other search spaces, e.g. EPDCCH is configured for unlicensed carriers, CIF value can be used to indicate unlicensed carrier index.

EPDCCH, enhanced PDCCH is transmitted in the PDSCH region in contrast to the PDCCH. There can be multiple EPDCCH sets, where each EPDCCH set consist of a set of PRB pairs. The PRB pairs for each EPDCCH set are configured by RRC. The same DCI format as PDCCH is transmitted on EPDCCH. Because EPDCCH is transmitted in the PDSCH region of a carrier, there is no overlap between PDCCH and EPDCCH.

Another embodiment relates to the implementation of the above described various embodiments using hardware and software, or hardware only. In this connection the present disclosure provides a user equipment (mobile station) base station. The user equipment and base station are adapted to perform the methods described herein.

It is further recognized that the various embodiments of the present disclosure may be implemented or performed using computing devices (processors). A computing device or processor may for example be general purpose processors, digital signal processors (DSP), application specific integrated circuits (ASIC), field programmable gate arrays (FPGA) or other programmable logic devices, etc. In addition, radio transmitter and radio receiver and other necessary hardware may be provided in the apparatuses (UE, MeNB, SeNB). The various embodiments of the present disclosure may also be performed or embodied by a combination of these devices.

Further, the various embodiments of the present disclosure may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

It should be further noted that the individual features of the different embodiments of the present disclosure may individually or in arbitrary combination be subject matter to another present disclosure.

It would be appreciated by a person skilled in the art that numerous variations and/or modifications may be made to the present disclosure as shown in the specific embodiments without departing from the spirit or scope of the present disclosure as broadly described. The present embodiments are, therefore, to be considered in all respects to be illustrative and not restrictive.

What is claimed is:

1. A mobile station for receiving Physical Downlink Control CHannel (PDCCH) assignments in a mobile communication system, the mobile station to be configured with at least two serving cells among a plurality of serving cells, the at least two serving cells having different serving cell indices, the mobile station comprising:

at least one processor, and at least one memory device storing at least one program that, when executed by the at least one processor, causes the mobile station to:

monitor a same set of candidates for PDCCH assignments defining a same search space which is specific to the mobile station and which is determined independently of the indices of the at least two serving cells with which the mobile station is to be configured, and receive, for the at least two serving cells, the PDCCH assignments from among the monitored same set of candidates using carrier indicator field (CIF) values in the received PDCCH assignments for identifying the at least two serving cells with which the mobile station is to be configured, wherein the CIF values, included in the received PDCCH assignments, correspond to the respective indices of the at least two serving cells with which the mobile station is to be configured, wherein the mobile station receives at least one radio resource control (RRC) reconfiguration message in response to the mobile station being configured with the at least two serving cells among the plurality of serving cells, wherein the at least one RRC reconfiguration message received by the mobile station includes a same carrier indicator field value ($n_{CI}$) for independently determining the same search space for the at least two serving cells, wherein the same search space $S^{(L)}_k$ for the at least two serving cells is determined using the same $n_{CI}$ value, applying the formula:

$$S_k^{(L)} = L\{(Y_k + m') \bmod \lfloor N_{CCE,k}/L \rfloor\} + i$$

wherein an aggregation level L is defined as $L \in \{1, 2, 4, 8\}$, wherein $i=0, \ldots, L-1$, wherein $Y_k$ is defined as $Y_k = (A \cdot Y_{k-1}) \bmod D$, wherein for the search space specific to the mobile station $m' = m + M^{(L)} \cdot n_{CI}$, where $n_{CI}$ is included in the received RRC reconfiguration message, and wherein $M^{(L)}$ is the number of the set of candidates of PDCCH assignments to monitor in the given search space, wherein $N_{CEE,k}$ is the total number of CCEs in the control region of subframe k, and wherein $Y_{-1} = n_{RNTI} \neq 0$, A=39827, D=65537, $k = \lfloor n_s/2 \rfloor$, and $n_s$ is the slot number within a radio frame.

2. The mobile station according to claim 1, wherein the at least one RRC reconfiguration message received by the mobile station includes, for each of the at least two serving cells, different serving cell indices, and the same $n_{CI}$ value, such that the $n_{CI}$ value, determining the same search space for the at least two serving cells, is independent of the indices of the at least two serving cells with which the mobile station is to be configured.

3. A mobile station for receiving Physical Downlink Control CHannel (PDCCH) assignments in a mobile communication system, the mobile station to be configured with at least two serving cells among a plurality of serving cells, the at least two serving cells having different serving cell indices, the mobile station comprising:

at least one processor, and at least one memory device storing at least one program that, when executed by the at least one processor, causes the mobile station to:

monitor a same set of candidates for PDCCH assignments defining a same search space which is specific to the mobile station and which is determined according to the same index of the at least two serving cells with which the mobile station is to be configured, and receive, for the at least two serving cells, PDCCH assignments from among the monitored same set of candidates which identify the at least two serving cells, with which the mobile station is to be configured, independently of carrier indicator field (CIF) value in the received PDCCH assignments, wherein the CIF value, included in the received PDCCH assignments, corresponds to the respective index of the at least two serving cells with which the mobile station is to be configured, wherein the mobile station receives at least one radio resource control (RRC) reconfiguration message in response to the mobile station being configured with the at least two serving cells among the plurality of serving cells, wherein the at least one RRC reconfiguration message received by the mobile station includes a same carrier indicator field value ($n_{CI}$) for determining the same search space for the at least two serving cells according to the same index of the at least two serving cells included in the RRC reconfiguration message, wherein the same search space $S^{(L)}_k$ for the at least two serving cells is determined using the same $n_{CI}$ value, applying the formula:

$$S_k^{(L)} = L\{(Y_k + m') \bmod \lfloor N_{CCE,k}/L \rfloor\} + i$$

wherein an aggregation level L is defined as $L \in \{1, 2, 4, 8\}$, wherein $i=0, \ldots, L-1$, wherein $Y_k$ is defined as $Y_k = (A \cdot Y_{k-1}) \bmod D$, wherein for the search space specific to the mobile station $m' = m + M^{(L)} \cdot n_{CI}$, where $n_{CI}$ is included in the received RRC reconfiguration message, and wherein $M^{(L)}$ is the number of the set of candidates of PDCCH assignments to monitor in the given search space, wherein $N_{CEE,k}$ is the total number of CCEs in the control region of subframe k, and wherein $Y_{-1} = n_{RNTI} \neq 0$, A=39827, D=65537, $k = \lfloor n_s/2 \rfloor$, and $n_s$ is the slot number within a radio frame.

4. The mobile station according to claim 3, wherein each of the PDCCH assignments received by the mobile station includes a Resource Block Assignment (RBA) field, and the RBA field includes information for identifying the at least two serving cells.

5. The mobile station according to claim 4, wherein the information for identifying the at least two serving cells included in the RBA field in each of the received PDCCH assignments is combined with the allocation information while maintaining the same number of bits.

6. The mobile station according to claim 3, wherein the PDCCH assignments received by the mobile station are in a dedicated format including a separate field for identifying the at least two serving cells.

7. A method for receiving Physical Downlink Control CHannel (PDCCH) assignments in a mobile communication system including a plurality of serving cells, the mobile station to be configured with at least two serving cells among a plurality of serving cells, the at least two serving cells having different serving cell indices, the mobile station, the method comprising:

monitoring, by the mobile station, for the at least two serving cells, a same set of candidates for PDCCH assignments defining a same search space which is specific to the mobile station and which is determined independently of the indices of the at least two serving cells with which the mobile station is configured;

receiving, by the mobile station, for the at least two serving cells, PDCCH assignments from among the monitored same set of candidates using carrier indicator field (CIF) values in the received PDCCH assignments for identifying the at least two serving cells with which the mobile station is to be configured; and receiving, by the mobile station, at least one radio resource control (RRC) reconfiguration message in response to the mobile station being configured with the at least two serving cells among the plurality of serving cells, wherein the CIF values, included in the received PDCCH assignments, correspond to the respective indices of the at least two serving cells with which the mobile station is to be configured, wherein the at least one RRC reconfiguration message received by the mobile station includes a same carrier indicator field value ($n_{CI}$) for independently determining the same search space for the at least two serving cells, wherein the same search space $S^{(L)}_k$ for the at least two serving cells is determined using the same $n_{CI}$ value, applying the formula:

$$S_k^{(L)} = L\{(Y_k + m') \bmod \lfloor N_{CCE,k}/L \rfloor\} + i$$

wherein an aggregation level L is defined as L∈{1, 2, 4, 8}, wherein i=0, ..., L−1, wherein $Y_k$ is defined as $Y_k = (A \cdot Y_{k-1}) \bmod D$, wherein for the search space specific to the mobile station m'=m+$M^{(L)} \cdot n_{CI}$, where $n_{CI}$ is included in the received RRC reconfiguration message, and wherein $M^{(L)}$ is the number of the set of candidates of PDCCH assignments to monitor in the given search space, wherein $N_{CCE,k}$ is the total number of CCEs in the control region of subframe k, and wherein $Y_{-1} = n_{RNTI} \neq 0$, A=39827, D=65537, k=$\lfloor n_s/2 \rfloor$, and $n_s$ is the slot number within a radio frame.

8. The method according to claim 7,
wherein the at least one RRC reconfiguration message received by the mobile station includes, for each of the at least two serving cells,
different serving cell indices, and the same $n_{CI}$ value, such that the $n_{CI}$ value, determining the same search space for the at least two serving cells, is independent of the indices of the at least two serving cells with which the mobile station is to be configured.

9. A method for receiving Physical Downlink Control CHannel (PDCCH) assignments in a mobile communication system including a plurality of serving cells, the mobile station to be configured with at least two serving cells among a plurality of serving cells, the at least two serving cells having different serving cell indices, the mobile station, the method comprising:

monitoring, by the mobile station, for the at least two serving cells, a same set of candidates for PDCCH assignments defining a same search space which is specific to the mobile station and which is determined according to the same index of the at least two serving cells with which the mobile station is to be configured;

receiving, by the mobile station, for the at least two serving cells, PDCCH assignments from among the monitored same set of candidates which identify the at least two serving cells, with which the mobile station is to be configured, independently of carrier indicator field (CIF) value in the received PDCCH assignments; and receiving, by the mobile station, at least one radio resource control (RRC) reconfiguration message in response to the mobile station being configured with the at least two serving cells among the plurality of serving cells, wherein the CIF value, included in the received PDCCH assignments, corresponds to the respective index of the at least two serving cells with which the mobile station is to be configured, wherein the at least one RRC reconfiguration message received by the mobile station includes a same carrier indicator field value ($n_{CI}$) for independently determining the same search space for the at least two serving cells, wherein the same search space $S^{(L)}_k$ for the at least two serving cells is determined using the same $n_{CI}$ value, applying the formula:

$$S_k^{(L)} = L\{(Y_k + m') \bmod \lfloor N_{CCE,k}/L \rfloor\} + i$$

wherein an aggregation level L is defined as L∈{1, 2, 4, 8}, wherein i=0, ..., L−1, wherein $Y_k$ is defined as $Y_k = (A \cdot Y_{k-1}) \bmod D$, wherein for the search space specific to the mobile station m'=m+$M^{(L)} \cdot n_{CI}$, where $n_{CI}$ is included in the received RRC reconfiguration message, and wherein $M^{(L)}$ is the number of the set of candidates of PDCCH assignments to monitor in the given search space, wherein $N_{CCE,k}$ is the total number of CCEs in the control region of subframe k, and wherein $Y_{-1} = n_{RNTI} \neq 0$, A=39827, D=65537, k=$\lfloor n_s/2 \rfloor$, and $n_s$ is the slot number within a radio frame.

* * * * *